United States Patent
Eckert et al.

(10) Patent No.: US 11,362,959 B2
(45) Date of Patent: Jun. 14, 2022

(54) LATENCY BASED FORWARDING OF PACKETS WITH DESTINATION POLICIES

(71) Applicant: Futurewei Technologies, Inc., Plano, TX (US)

(72) Inventors: Toerless Eckert, Mountain View, CA (US); Alexander Clemm, Los Gatos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 34 days.

(21) Appl. No.: 16/822,458

(22) Filed: Mar. 18, 2020

(65) Prior Publication Data

US 2021/0297362 A1 Sep. 23, 2021

(51) Int. Cl.
*H04L 12/875* (2013.01)
*H04L 47/56* (2022.01)
(Continued)

(52) U.S. Cl.
CPC .............. *H04L 47/56* (2013.01); *H04L 45/74* (2013.01); *H04L 47/6275* (2013.01)

(58) Field of Classification Search
CPC ... H04L 45/121; H04L 47/18; H04L 47/2416; H04L 47/28; H04L 47/283; H04L 47/56; H04L 43/12; H04L 47/2483; H04L 45/50; H04L 47/17; H04L 47/724; H04L 47/825; H04L 12/865; H04L 45/74; H04L 47/224
(Continued)

(56) References Cited

U.S. PATENT DOCUMENTS 7,466,655 B1 * 12/2008 Zhao ..................... H04L 45/121
370/252
7,697,567 B2 * 4/2010 Ono .................... H04L 47/2441
370/428
(Continued)

FOREIGN PATENT DOCUMENTS

WO WO2018/086558 A1 5/2018

OTHER PUBLICATIONS

International Search Report & The Written Opinion of the International Searching Authority dated Jun. 8, 2020, International Application No. PCT/US2020/023288.
(Continued)

*Primary Examiner* — Man U Phan
(74) *Attorney, Agent, or Firm* — Vierra Magen Marcus LLP

(57) ABSTRACT

Latency Based Forwarding (LBF) techniques are presented for the management of the latencies, or delays, of packets forwarded over nodes, such as routers, of a network. In addition to a network header indicating a destination node for receiving the packet, a packet also includes an LBF header indicating the packets accumulated delay since leaving the sender, a maximum latency for the entire journey from the sender to the receiver and a minimum latency for the entire journey from the sender to the receiver. When a packet is received at a node, based on the accumulated delay, the maximum latency, and the minimum latency, the node places the packet in a forwarding queue to manage the delays between the sender and the receiver. The LBF can also indicate a policy for the forwarding node to used when determining the enqueueing of the packet.

17 Claims, 14 Drawing Sheets

(51) Int. Cl.
*H04L 47/6275* (2022.01)
*H04L 45/74* (2022.01)

(58) Field of Classification Search
USPC .......................................................... 370/392
See application file for complete search history.

(56) References Cited

U.S. PATENT DOCUMENTS

| | | | | |
|---|---|---|---|---|
| 7,756,026 B2* | 7/2010 | Weiss | .................. | H04L 47/52 |
| | | | | 370/395.41 |
| 7,852,763 B2* | 12/2010 | Ghanadan | ........... | H04L 47/2441 |
| | | | | 370/230.1 |
| 8,385,210 B1* | 2/2013 | Weill | .................. | H04L 47/6275 |
| | | | | 370/252 |
| 8,891,513 B1* | 11/2014 | Huang | .................. | H04L 49/253 |
| | | | | 370/352 |
| 9,124,482 B2* | 9/2015 | Vasseur | ................. | H04L 45/121 |
| 9,130,864 B2* | 9/2015 | Keith | ................. | H04L 47/2433 |
| 9,237,112 B2* | 1/2016 | Stanwood | ........... | H04L 47/2475 |
| 9,276,760 B2* | 3/2016 | Flynn | ................. | H04L 45/20 |
| 9,531,635 B2* | 12/2016 | Vasseur | ................. | H04L 45/24 |
| 9,609,543 B1* | 3/2017 | Vivanco | ........... | H04W 72/0446 |
| 10,015,068 B2* | 7/2018 | Mäenpää | ............. | H04L 65/605 |
| 10,250,518 B2* | 4/2019 | Park | ................. | H04L 47/6255 |
| 10,560,383 B2* | 2/2020 | Song | ................. | H04L 47/12 |
| 10,686,616 B2* | 6/2020 | Nguyen | ............. | H04L 12/1886 |
| 10,972,398 B2* | 4/2021 | Jiang | ................. | H04L 43/12 |
| 2013/0022042 A1 | 1/2013 | Vasseur et al. | | |
| 2016/0285720 A1 | 9/2016 | Maenpaa et al. | | |
| 2020/0162397 A1* | 5/2020 | Levi | ................. | H04L 47/56 |
| 2021/0014168 A1* | 1/2021 | Geng | ................. | H04L 45/121 |
| 2021/0119922 A1* | 4/2021 | Zhang | ................. | H04L 43/0864 |

OTHER PUBLICATIONS

International Search Report & The Written Opinion of the International Searching Authority dated Jun. 12, 2020, International Application No. PCT/US2020/023289.

* cited by examiner

US 11,362,959 B2

LATENCY BASED FORWARDING OF PACKETS WITH DESTINATION POLICIES

RELATED APPLICATION

This application is related to commonly invented and commonly assigned U.S. Provisional Patent Application No. 62/820,350, filed Mar. 19, 2019, which is hereby incorporated by reference into the present application.

TECHNICAL FIELD

The disclosure generally relates to communication networks, and more particularly, to the transmission of packets over networks.

BACKGROUND

Network packets are formatted units of data carried by packet-mode computer networks. High-precision networks demand high-precision service-level guarantees when delivering packets from a sending node on the network, such as a server, router or switch, to a receiving node on the network. Traditionally, networks are structured to deliver packets from the sending node to the receiving node as quickly as possible; however, this does not describe how to resolve priorities when packets have to compete to be forwarded; and there are circumstances where this is not the most effective technique for the transfer of packets.

SUMMARY

According to one aspect of the present disclosure, a node for transferring packets over a network includes a network interface configured to receive and forward packets over the network, one or more queues configured to store packets to forward over the network, and one or more processors coupled to the one or more queues and the network interface. The one or more processors are configured to receive, from the network interface, a packet, the packet including a network header, indicating a network destination, and a forwarding header, the forwarding header indicating an accumulated delay experienced by the packet since being transmitted by a network sender, a minimum latency for the transfer of the packet from the network sender to the network destination and a latency policy. The one or more processors are also configured to update the accumulated delay experienced by the packet that is indicated by the forwarding header; and determine a minimum delay at the node for the packet based on the minimum latency and the updated indicated accumulated delay experienced by the packet. The one or more processors are further configured to determine a queueing rank for the packet from the minimum delay and the latency policy and enter the packet into one of the queues based on the determined queueing rank for the packet.

Optionally, in the preceding aspect, the forwarding header further indicates a maximum latency for the transfer of the packet from the network sender to the network destination, and the one or more processors are further configured to: determine a maximum delay at the node for the packet based on the maximum latency and the updated indicated accumulated delay experienced by the packet; and further determine the queueing rank for the packet from the maximum delay.

Optionally, in the preceding aspect, the one or more queues are a plurality of queues, and the one or more processors are further configured to: rank the plurality of queues based upon priorities of packets enqueued therein; determine the priority for the packet from the maximum delay for the packet and the minimum delay for the packet; and enter the packet into one of the queues. The packet is entered into one of the queues by determining, based the packet's priority, into which of the queues to enter the packet and entering the packet into the determined one of the queues based on the determined queueing rank for the packet.

Optionally, in any of the preceding aspects, the one or more processors are further configured to receive a number of hops from the node to the network destination and to further determine the minimum delay based on the number of hops.

Optionally, in the preceding aspect, the latency policy indicates equally sharing an amount of minimum latency exceeding a difference between the updated indicated accumulated delay experienced by the packet between the node and the number of hops.

Optionally, in any of the preceding aspects, the one or more processors are further configured to: receive an estimated amount of time for fixed transfer times between the node and the network destination; and to further determine the minimum delay based on the estimated amount of time for fixed transfer times between the node and the network destination.

Optionally, in any of the preceding aspects, the forwarding header further indicates a maximum latency for the transfer of the packet from the network sender to the network destination, and the one or more processors are further configured to discard the packet if the updated accumulated delay experienced by the packet exceeds the maximum latency.

Optionally, in any of the preceding aspects, the node is a router.

According to second set of aspects of the present disclosure, a method of transferring a packet over a network includes receiving, at a node, a packet including a network header, indicating a network destination, and a forwarding header, the forwarding header indicating an accumulated delay experienced by the packet since being transmitted by a network sender, a minimum latency for the transfer of the packet from the network sender to the network destination and a latency policy. The method also includes updating, by the node, the accumulated delay experienced by the packet that is indicated by the forwarding header, by the node, a minimum delay at the node for the packet based on the minimum latency and the updated indicated accumulated delay experienced by the packet; maintaining by the node of one or more queues of packets for transmission from the node; determining, by the node, a queueing rank for the packet from the minimum delay and the latency policy; and entering the packet into one of the queues based on the determined queueing rank for the packet.

Optionally, in the preceding aspect, the method includes: receiving, at the node, a number of hops from the node to the network destination, and wherein determining the minimum delay at the node for the packet is further based on the number of hops.

Optionally, in the preceding aspect, the latency policy indicates equally sharing an amount of minimum latency exceeding a difference between exceeding the updated indicated accumulated delay experienced by the packet between the node and the number of hops.

Optionally, in any of the preceding aspects for the method of the second set of aspects, the method further includes receiving, at the node, an estimated amount of time for fixed transfer times between the node and the network destination; and wherein determining the minimum delay at the node for the packet is further based on the estimated amount of time for fixed transfer times between the node and the network destination.

Optionally, in any of the preceding aspects for the method of the second set of aspects, the forwarding header further indicates a maximum latency for the transfer of the packet from the network sender to the network destination, the method further comprising: discarding the packet if the updated accumulated delay experienced by the packet exceeds the maximum latency.

Optionally, in any of the preceding aspects for the method of the second set of aspects, the forwarding header further indicates a maximum latency for the transfer of the packet from the network sender to the network destination, the method further comprising: determining, by the node, a maximum delay at the node for the packet based on the maximum latency and the updated indicated accumulated delay experienced by the packet, and wherein the queueing rank for the packet is further determined from the maximum delay.

Optionally, in the preceding aspect, the node maintains a plurality of queues of packets for transmission from the node, the method further comprising: determining, by the node, a priority for the packet from the maximum delay for the packet and the minimum delay for the packet; and ranking the plurality of queues based upon priorities of packets enqueued therein, wherein entering the packet into one of the queues. Entering the packet into one of the queues includes: determining, based the packet's priority, into which of the queues to enter the packet; and entering the packet into the determined one of the queues based on the determined queueing rank for the packet.

According to a further set of aspects of the present disclosure, a system for transmitting packets from a sending network device to a receiving network device includes one or more nodes connectable in series to transfer a packet from the sending network device to the receiving network device, one or more queues configured to store packets to forward over the network, and one or more processors coupled to the one or more queues and the network interface. Each of the nodes comprises: a network interface configured to receive and forward the packet over the network, the packet including a network header, indicating the receiving network device, and a forwarding header, indicating an accumulated delay experienced by the packet since being transmitted by the sending network device, a minimum latency for the transfer of the packet from the sending network device to the receiving network device and a latency policy. The one or more processors are configured to: receive the packet from the network interface; update the accumulated delay experienced by the packet that is indicated by the forwarding header; determine a minimum delay at the node for the packet based on the minimum latency and the updated indicated accumulated delay experienced by the packet; determine a queueing rank for the packet from the minimum delay and the latency policy; and enter the packet into one of the queues based on the determined queueing rank for the packet.

Optionally, in the preceding aspect, for each of the one or more nodes, the one or more processors are further configured to: receive a number of hops between the node to the receiving network device; and to further determine the minimum delay based on the number of hops.

Optionally, in any of the preceding further aspects for a system, for each of the one or more nodes, the one or more processors are further configured to: receive an estimated amount of time for fixed transfer times between the node to the receiving network device; and to further determine the minimum delay based on the estimated amount of time for fixed transfer times between the node and the receiving network device.

Optionally, in any of the preceding further aspects for a system, the forwarding header further indicates a maximum latency for the transfer of the packet from the sending network device to the receiving network device, and, for each of the one or more nodes, the one or more processors are further configured to: determine a maximum delay at the node for the packet based on the maximum latency and the updated indicated accumulated delay experienced by the packet; and further determine the queueing rank for the packet from the maximum delay.

Optionally, in the preceding aspect, the one or more queues are a plurality of queues, and, for each of the one or more nodes, the one or more processors are further configured to: rank the plurality of queues based upon priorities of packets enqueued therein; determine a priority for the packet from the maximum delay for the packet and the minimum delay for the packet; and enter the packet into one of the queues by determining, based the packet's priority, into which of the queues to enter the packet and entering the packet into the determined one of the queues based on the determined queueing rank for the packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1:
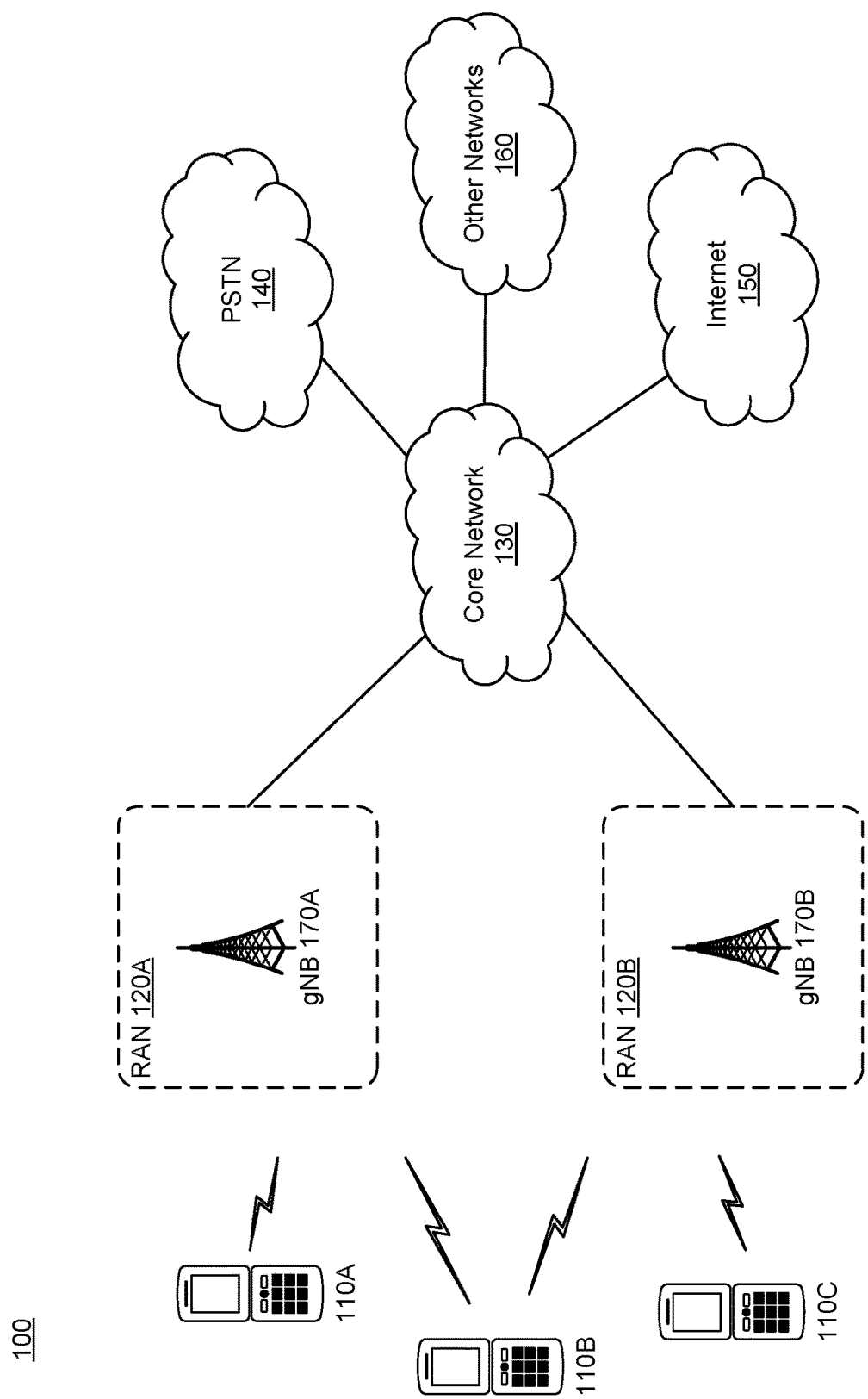
FIG. 1 illustrates an exemplary communication system for communicating data.

The present disclosure will now be described with reference to the figures, which in general relate to methods and devices (e.g., routers) to manage latencies when transferring packets over networks. It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

High-precision networks demand high-precision service-level guarantees that can be characterized through a set of Service Level Objectives (SLOs), which are performance goals for a service under certain well-defined constraints. A delay, or latency, based SLO can indicate a specific end-to-end delay, given a certain not-to-exceed packet rate or bandwidth. Examples can include an upper bound ("delay not to exceed"); a lower bound (less common, but useful in certain scenarios); and special cases such as an "in-time guarantee" (where an upper bound but not a lower bound is indicated) or an "on-time guarantee" (lower bound=upper bound). Previous approaches do not allow for the specification of quantifiable latency SLOs that are provided by the network, where any upper bound will typically indicate "low latency" without quantification, and any minimum latency or delay results from unplanned congestion at the buffers of the egress nodes, rather than being indicated. In the following, "delay" and "latency" are largely used interchangeably in terms of meaning, although in some cases these will be used to refer to differing quantities, such as when a "minimum latency" is used to indicate a lower bound of an end-to-end latency value while a "minimum delay" may be used to indicate an amount of time a packet is to spend at a particular node.

Examples of applications where in-time guarantees (where an upper bound but not a lower bound is indicated) can be of use are in Virtual Reality/Augmented Reality (VR/AR), which can have stringent limits on the maximum motion-to-photon time, such as to avoid dizziness and reduced quality of experience that can result from longer delays and may severely reduce user acceptance. Another example is for Tactile Internet having stringent limits to delay for haptic feedback, as a lack of sensation of being in control or sluggish control would make many applications infeasible. Further examples can include industrial controllers, that can have stringent limits to feedback control loops, and applications such as vehicle to everything (V2X), remote-controlled robots and drones, and similar cases.

On-time guarantees, which are stronger than in-time guarantees, can be used when application buffers cannot be assumed. On-time guarantees can provide fairness by not giving anyone an unfair advantage in multiparty applications and marketplaces, such as for trading or gaming (including those involving tactile internet). On-time guarantees can also be useful for synchronization in examples such as robot collaboration (e.g., lifting a packet by two remotely controlled robots) or high-precision measurements (e.g., remote polling at exact intervals).

The techniques presented in the following discussion provide a system that delivers packets that traverse a network in accordance with a quantified delay SLO. The SLO indicates a delay range with quantifiable lower and upper bounds that can be varied for each individual packet. Previous networking technologies do not provide this capability, but are instead typically engineered to "minimize" delay by using a range of techniques ranging from dimensioning links to reserving resources and performing admission control functions. These previous approaches are not engineered to hit a specific quantified delay or target, and there is no networking algorithm that would hit that delay as part of a function of the network itself. Instead, the technology presented here provides the capability to do this without need for centralized coordination and control logic, but in a way that is performed "in-network", thereby reducing controller dependence. The technology presented here further does so in a way that keeps the buffers of egress edge devices small (to reduce cost) and in a way that SLO is adhered to for a "first packet" (and does not require connection setup/handshake).

The embodiments presented here include a network with network nodes which perform a distributed algorithm that can deliver packets in accordance with a delay SLO with quantifiable lower and upper delay bounds. The distributed algorithm processes a packet on each node as it traverses the network following a local algorithm that: measures the delay that has been incurred by the packet since it was sent by the source; determines the remaining delay budget, based on SLO, delay, and prediction of downstream delay; and speeds up or slows down the packet per an action that best fits the budget. Possible actions include matching queue delay to action, and selecting from a set of downstream paths based on expected delays or buffering. Optionally, when a packet is beyond salvaging, it may be dropped.

FIG. 1 illustrates an exemplary communication system 100 with which embodiments of the present technology can be used. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks, including corporate intranets. While certain numbers of these components or elements are shown in the figure, any number of these components or elements may be included in the system 100.

In one embodiment, the communication system 100 can include a wireless network, which may be a fifth generation (5G) network including at least one 5G base station which employs orthogonal frequency-division multiplexing (OFDM) and/or non-OFDM and a transmission time interval (TTI) shorter than 1 milliseconds (e.g. 100 or 200 microseconds), to communicate with the communication devices. In general, a base station may also be used to refer to any of the eNB and the 5G BS (gNB). In addition, the network may further include a network server for processing information received from the communication devices via the at least one eNB or gNB.

System 100 enables multiple users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A, 110B, and 110C, which can be referred to individually as an UE 110, or collectively as the UEs 110, are configured to operate and/or communicate in the system 100. For example, an UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices, consumer electronics device, device-to-device (D2D) user equipment, machine type user equipment or user equipment capable of machine-to-machine (M2M) communication, iPads, Tablets, mobile terminals, laptop embedded equipped (LEE), laptop mounted equipment (LME), USB dongles, or other non-limiting examples of user equipment or target device.

In the depicted embodiment, the RANs 120A, 120B include one or more base stations (BSs) 170A, 170B, respectively. The RANs 120A and 120B can be referred to individually as a RAN 120, or collectively as the RANs 120. Similarly, the base stations (BSs) 170A and 170B can be referred to individually as a base station (BS) 170, or collectively as the base stations (BSs) 170. Each of the BSs 170 is configured to wirelessly interface with one or more of the UEs 110 to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the BS 170A forms part of the RAN 120A, which may include one or more other BSs 170, elements, and/or devices. Similarly, the BS 170B forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMO) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+standards and protocols. Of course, other multiple access schemes and wireless protocols may be utilized.

The RANs 120 are in communication with the core network 130 to provide the UEs 110 with voice, data, application, Voice over Internet Protocol (Vol P), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipments, base stations, networks, or other components in any suitable configuration. It is also appreciated that the term user equipment may refer to any type of wireless device communicating with a radio network node in a cellular or mobile communication system.

The networks 130, 140, 150 and/or 160 will commonly transfer data as packets, in which network packets are formatted units of data carried by a packet-mode computer networks. The embodiments presented below are primarily concerned with the transmission of such packets over networks and the management of latencies of such transmissions.

Figure 2:
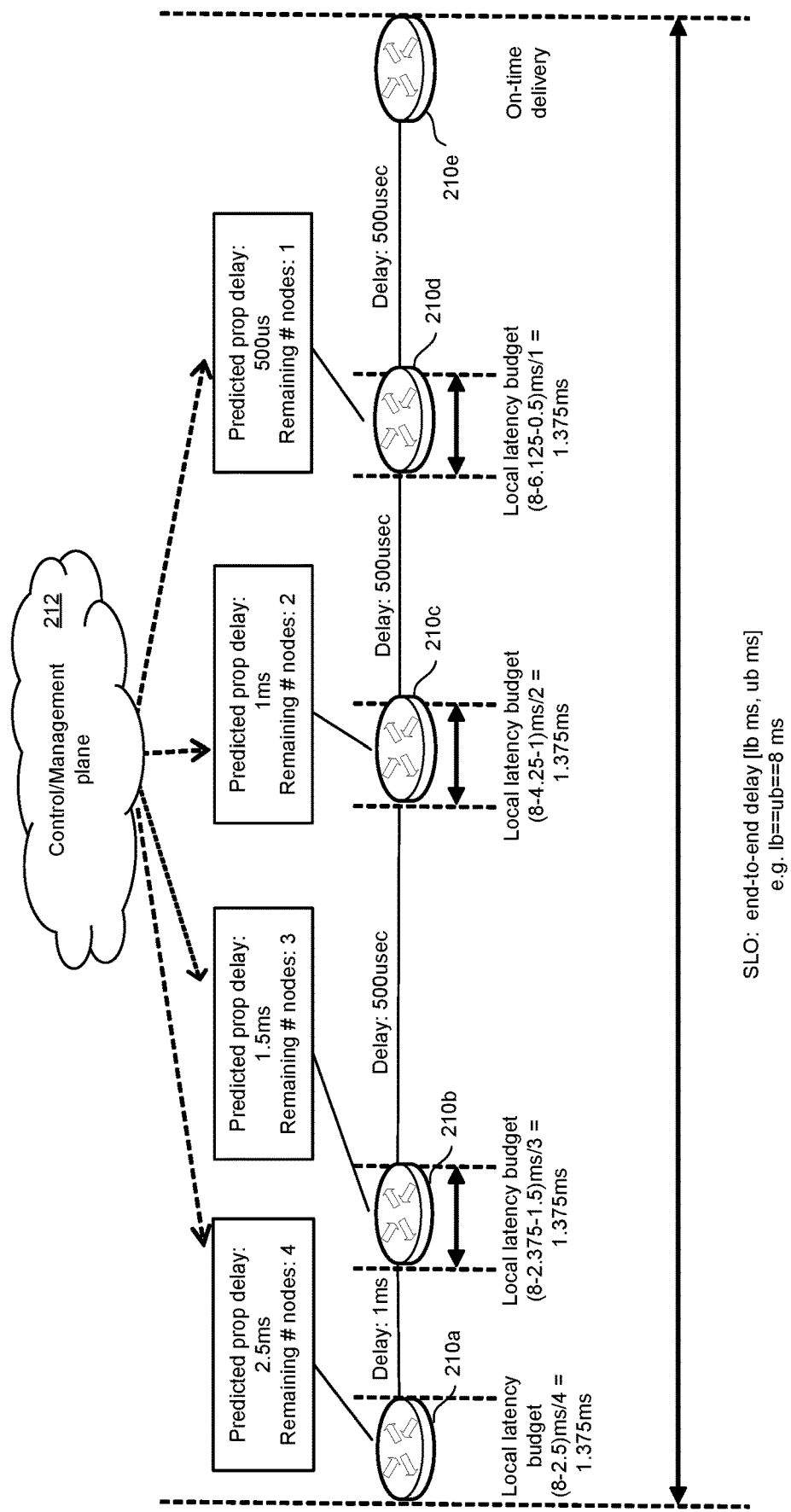
FIG. 2 illustrates an exemplary network of a series of nodes, such as routers, which may be included in one of the networks shown in FIG. 1.

FIG. 2 illustrates an example network 200 that includes networking devices 210a, 210b, 210c, 210d, and 210e, which can be routers, networking switches, servers, or other networking devices. For example, networking device 210a could be a server sending packets, 210b, 210c, and 210d routers, and 210e an edge device. To simplify the following discussion, these networking devices will often be referred to as nodes, but it will be understood that each of these can be various networking devices.

In the following, each of the nodes 210a, 210b, 210c, 210d, and 210e can be referred to as a node 210, or which can be collectively referred to as the nodes 210. While only five nodes 210 are shown in FIG. 2, a network would likely include significantly more than four nodes 210. In much of the following discussion, the nodes will sometimes be referred to a routers, but will be understood to more generally be nodes. FIG. 2 also illustrates a network control/management plane 212 that is communicatively coupled to each of the routers or nodes 210 of the network, as represented in dashed lines. The control/management plane 212 can be used to perform a variety of control path and/or control plane functions. The control/management plane of a network is the part of the node architecture that is responsible for collecting and propagating the information that will be used later to forward incoming packets. Routing protocols and label distribution protocols are parts of the control plane.

FIG. 2 can be used to illustrate the management of latencies of packets as transmitted from a sending network device, or node, 210a over the intermediate nodes 210b-210d to a receiving network device, or node, 210e. FIG. 2 presents an example where the service level objective (SLO) indicates an end-to-end delay or latency with a lower bound of lb milliseconds and an upper bound of ub milliseconds and where lb and ub are both taken to be the same (an "on-time guarantee") at 8 ms. The total non-queuing path propagation latency will be the sum of the fixed delays between each of the nodes and the local delays in each of the intermediate nodes. In the FIG. 2, the delay for a packet to travel between node 210a and node 210b is 1 ms and the delays between node 210b and node 210c, between node 210c and node 210d, and between node 210d and 210e are all 500 μs. The control/management plane 212 can notify each node of the number of remaining nodes, or hops, towards each possible destination and the predicted non-queuing propagation latency towards each destination calculated by adding up the non-queuing propagation latency of all hops from this node to a the destination. As described in more detail below, based upon this information and the amount of delay that the packet has experienced so far, the node can determine a local latency budget for the packet in the node.

Continuing with the example of FIG. 2, at node 210a the predicted propagation delay is (1 ms+500 μs+500 μs+500 μs)=2.5 ms and there are 4 hops to arrive at destination node 210e, giving node 210a a local latency budget of:

$$(8-2.5) \text{ ms}/4=1.375 \text{ ms}.$$

The amount of propagation time from node 210a to 210b is 1 ms and the control/management plane 212 provides node 210b with a predicted propagation delay of (500 μs+500 μs+500 μs)=1.5 ms and 3 remaining nodes. Taking the allotted 8 ms for the entire end-to-end delay, subtracting the delay so far (1 ms propagation delay, 1.375 ms latency budgeted to node 210a) and predicted additional delay (1.5 ms), and then dividing by the number of remaining nodes (3) gives a local budget for latency at node 210b of:

$$(8-2.375-1.5) \text{ ms}/3=1.375 \text{ ms}.$$

The node 210b can determine when to transmit the packet based on this budget. The latency budget is similarly determined for node 210c based upon 8 ms total delay, a delay so far of (1.375+1+1.375+0.500) ms, predicted additional delay of 1 ms, giving a latency budget for node 210c of:

$$(8-4.25-1) \text{ ms}/2=1.375 \text{ ms}.$$

For node 210d, the latency budget is similarly calculated as:

$$(8-6.125-0.5) \text{ ms}/1=1.375 \text{ ms}.$$

With this budgeting, the packer arrives at node 210e in (6.125+1.375+0.5) ms=8.00 ms, as wanted.

If the actual local delay or latency is not as predicted, the local latency budgets can be adjusted accordingly. For example, if there were 1 ms additional unexpected delay related to node 210b, either arising on node 210b itself or during propagation between node 210b and 210c, this loss can be taken out of local latency budgets of nodes 210c and 210d. Revising the calculation of the previous paragraph to add in this extra 1 ms delay, the local latency budget of 210c becomes:

$$(8-5.25-1) \text{ ms}/2=0.875 \text{ ms}.$$

The local latency budget of 210d becomes:

$$(8-7.125-0.5) \text{ ms}/1=0.875 \text{ ms}.$$

This again allows the packet to arrive at the designated lb==ub==8 ms. As discussed in more detail below, when upper bound and lower bounds differ, both a minimum and a maximum lower latency budget are used:

Min-Local-latency-budget=(lb−latency-in-packet−path-delay-to-destination)/number-hops-to-destination;

and

Max-Local-latency-budget=(ub−latency-in-packet−path-delay-to-destination)/number-hops-to-destination.

In these expressions, "latency-in-packet" corresponds to the cumulative amount of delay or latency already experienced by the packet since leaving its source, and "path-delay-to-destination" is the expected amount of fixed transmission delay before the packet reaches its destination node.

Figure 3:
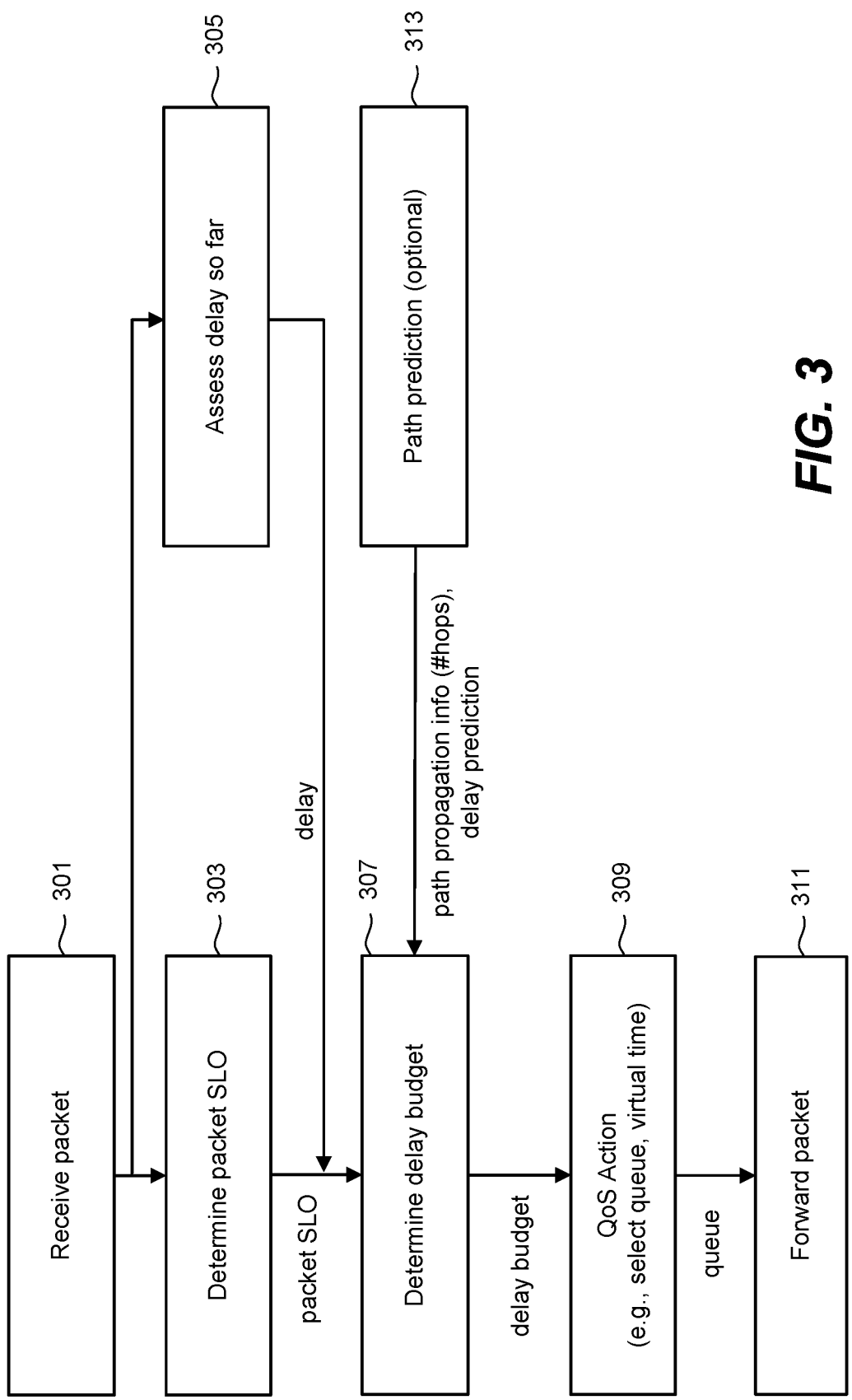
FIG. 3 is flowchart for one embodiment for the latency based forwarding of packets as illustrated in the example FIG. 2.

FIG. 3 is flowchart for one embodiment for the latency based forwarding of packets as illustrated in the example FIG. 2. Beginning at 301, a packet is received at an intermediate node, such as one of nodes 210b, 210c, or 210d in FIG. 2. Once the packet is received at 301, the packet's service level objective (SLO) can be determined from the packet's header 303 and the delay experienced by the packet so far is assessed at 305.

The SLO of a packet can differ between packets and can be maintained in a packet's forwarding header or other forwarding metadata and is determined by the node at 303. The SLO can indicate one or both of an upper bound and a lower bound for the total latency, or delay, for the packet as it is transmitted from the sending node (210a in FIG. 3) to the receiving node (210e in FIG. 2).

The packet can also carry information on the accumulated delay metadata, such as the amount of accumulated delay or latency experienced by the packet so far since it left the sending node. (In much of the following, latency and delay are used interchangeably in this context.) In 305, the node assesses the delay and can also update the delay before passing the packet on to the next node. In some embodiments, the accumulated delay metadata can be a timestamp, where the accumulated delay can be assessed based on the difference between the current time and packet's starting time, where the packet can carry its sending time (as a timestamp) the delay can be obtained by subtracting the sent time from the received time. This embodiment uses network time synchronization, but can keep the packet contents unaltered. In other embodiments, as discussed in more detail below, the packet can be changed to update the cumulative latency, where this approach does not require the synchronization of time across the different nodes. In other alternative embodiments, rather than assessing the current delay, the node can instead update the remaining SLO.

At 307, based upon the input of the packet's SLO (from 303) and delay (from 305), the node can determine the delay budget for the packet. As illustrated in FIG. 2, where the information on the number of remaining hops and predicted propagation delay is provided by the control/management plane 212, a path predictor can also supply path propagation and delay predictions, such as the number of hops to the destination and the fixed delays between these hops. With respect to receiving the number of hops and fixed delays, a node can access this information in various ways in order to make better latency based forwarding decisions depending on the embodiment. Depending on the embodiment, this information can be stored/maintained on the node itself. In some embodiments, this information can be configured/provisioned using a control or management application. In other embodiments, it can be communicated using a control plane protocol such as IGP (internet gateway protocol). In general, this information can be communicated/received separately from the packet itself, and can involve a different mechanism. In one set of embodiments, a node can receive, or be aware, of this information by way of a forwarding information database (FIB) from where it is disseminated using a separate control plane mechanism (IGP, provisioning at the node via a controller, etc.). Consequently, the assessment of 307 can be based on the inputs of the remaining path information of: number of nodes remaining; the fixed delay for remainder of path, which can be computed from the number of links remaining with propagation delay and the possible number of nodes with fixed minimum processing delay; and receive information precomputed by the control/management plane 212 and disseminated along with path information by the control/management plane 212. The output of the assessment of 307 is the delay budget.

In one set of embodiments for the compute logic used by the node at 309, the fixed latencies and the current delay can be subtracted from the SLO, which can then be divided by the number of remaining nodes, as described above with respect to the local delay budgets of the nodes 210b, 210c, and 210d in FIG. 2. In some embodiments, the target latency or delay at the node can be based on the midpoint between lower bound and upper bound as determined from the packet's SLO at 303. In other embodiments, for example, an adjustment step can be included, such as giving the budget closer to the lower bound if there are a large number of nodes remaining, such as, for example, the target amount of delay for the node can be set as target=midpoint−(midpoint−lower bound)/#remaining nodes. In one set of embodiments for the compute logic used by the node at 309, the fixed latencies and the current delay can be subtracted from the SLO, which can then be divided by the number of remaining nodes, as described above with respect to the local delay budgets of the nodes 210b, 210c, and 210d in FIG. 2. The assessment of delay budgets is described in more detail below.

Based on the delay budget from 307, at 309 the node can take a quality of service (QoS) action. For example, the node can maintain one or more queues in which it places packets ready for forwarding and then select a queue and a placement within the queue whose expected delay is the closest match for the packet's target delay budget (e.g., the first queue whose delay is less than or equal to the target delay). The node can assess a queue's latency as a function of queue occupancy, as well as other options, such as through the use of defined delay queues, for example. If the target delay budget is negative, a packet will miss its SLO. In case of a negative budget, depending on the embodiment the node could: discard or drop the packet; mark the packet as late, so that nodes downstream no longer need to prioritize the packet; or record an SLO violation in a statelet (e.g. update counter) of the packet. In other embodiments, the QoS action could include speeding up or slowing down a packet, or forwarding along a slower vs a faster path.

At 311 the packet is forwarded on the next node of its path. For example, after being entered into a queue based on its delay budget at 308, the packet would work its way up the queue until it is transmitted over the network.

Figure 4:
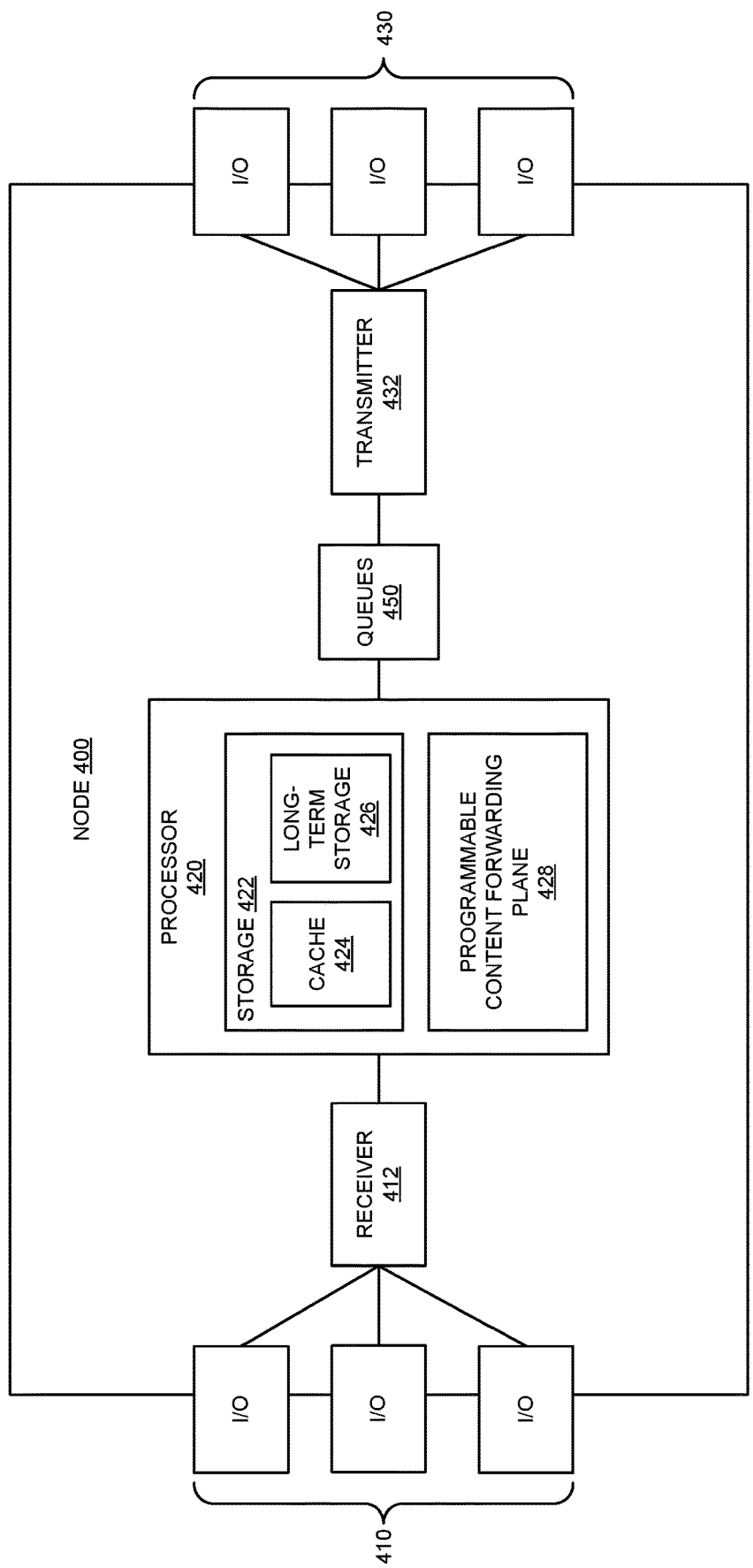
FIG. 4 is a schematic diagram illustrating exemplary details of a network device, or node, such as shown in the network of FIG. 2.

FIG. 4 is a schematic diagram illustrating exemplary details of a node 400, such as a router, switch, server or other network device, according to an embodiment. The node 400 can correspond to one of the nodes 210a, 210b, 210c, 210d, or 210e of FIG. 2. The router or other network node 400 can be configured to implement or support embodiments of the present technology disclosed herein. The node 400 may comprise a number of receiving input/output (I/O) ports 410, a receiver 412 for receiving packets, a number of transmitting I/O ports 430 and a transmitter 432 for forwarding packets. Although shown separated into an input section and an output section in FIG. 4, often these will be I/O ports 410 and 430 that are used for both downstream and up-stream transfers and the receiver 412 and transmitter 432 will be transceivers. Together I/O ports 410, receiver 412, I/O ports 430, and transmitter 432 can be collectively referred to as a network interface that is configured to receive and transmit packets over a network.

The node 400 can also include a processor 420 that can be formed of one or more processing circuits and a memory or storage section 422. The storage 422 can be variously embodied based on available memory technologies and in this embodiment is shown to have a cache 424, which could be formed from a volatile RAM memory such as SRAM or DRAM, and long-term storage 426, which can be formed of non-volatile memory such as flash NAND memory or other memory technologies. Storage 422 can be used for storing both data and instructions for implementing the packet forwarding techniques described here. Other elements on node 400 can include the programmable content forwarding plane 428 and the queues 450, which are explicitly shown and described in more detail below as they enter into the latency based packet forwarding methods developed in the following discussion. Depending on the embodiment, the programmable content forwarding plane 428 can be part of the more general processing elements of the processor 420 or a dedicated portion of the processing circuitry.

More specifically, the processor(s) 420, including the programmable content forwarding plane 428, can be configured to implement embodiments of the present technology described below. In accordance with certain embodiments, the memory 422 stores computer readable instructions that are executed by the processor(s) 420 to implement embodiments of the present technology. It would also be possible for embodiments of the present technology described below to be implemented, at least partially, using hardware logic components, such as, but not limited to, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc.

Figure 5:
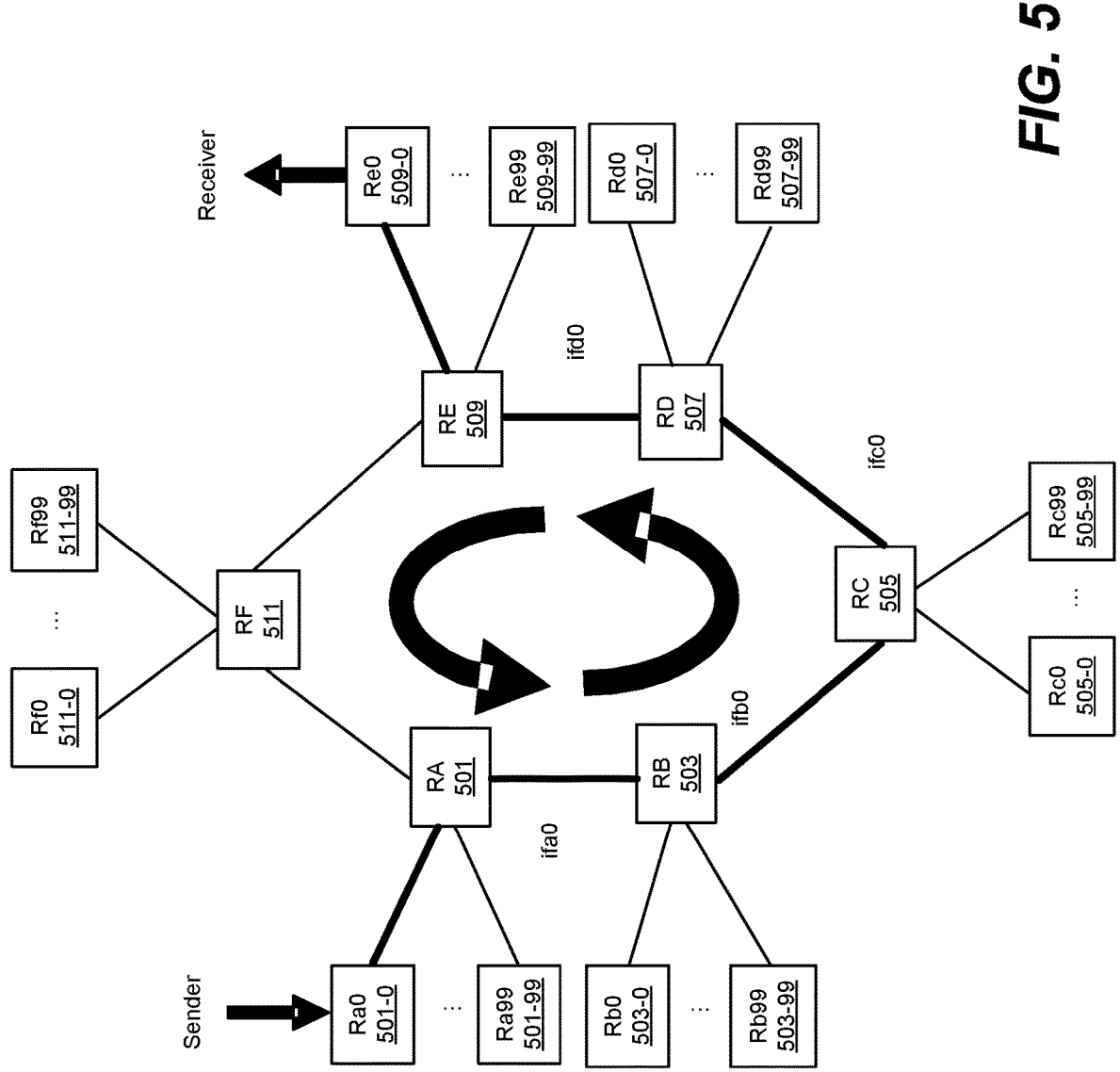
FIG. 5 provides an example of a network in which latency based forwarding (LBF) of packets can be implemented.

FIG. 5 provides an example of a network in which latency based forwarding of packets can be implemented. More specifically, FIG. 5 illustrates an aggregation ring, which is a common metropolitan broadband/mobile-access topology. In the example of FIG. 5, each of six ring routers (RA 501, RB 503, RC 505, RD 507, RE 509, RF 511) is connected to 100 access nodes, spoke routers (Ra0 501-0 to Ra99 501-99, Rb0 503-0 to Rb99 503-99, Rc0 505-0 to Rc99 505-99, Rd0 507-0 to Rd99 507-99, Re0 509-0 to Re99 509-99, Rf0 511-0 to Rf99 511-99). In FIG. 5, a packet is sent form the sending node Ra-0 501-0 to the receiving node Re-0 509-0, traversing the ring nodes of routers RA 501, RB 503, RC 505, RD 507, and RE 509.

Figure 13:
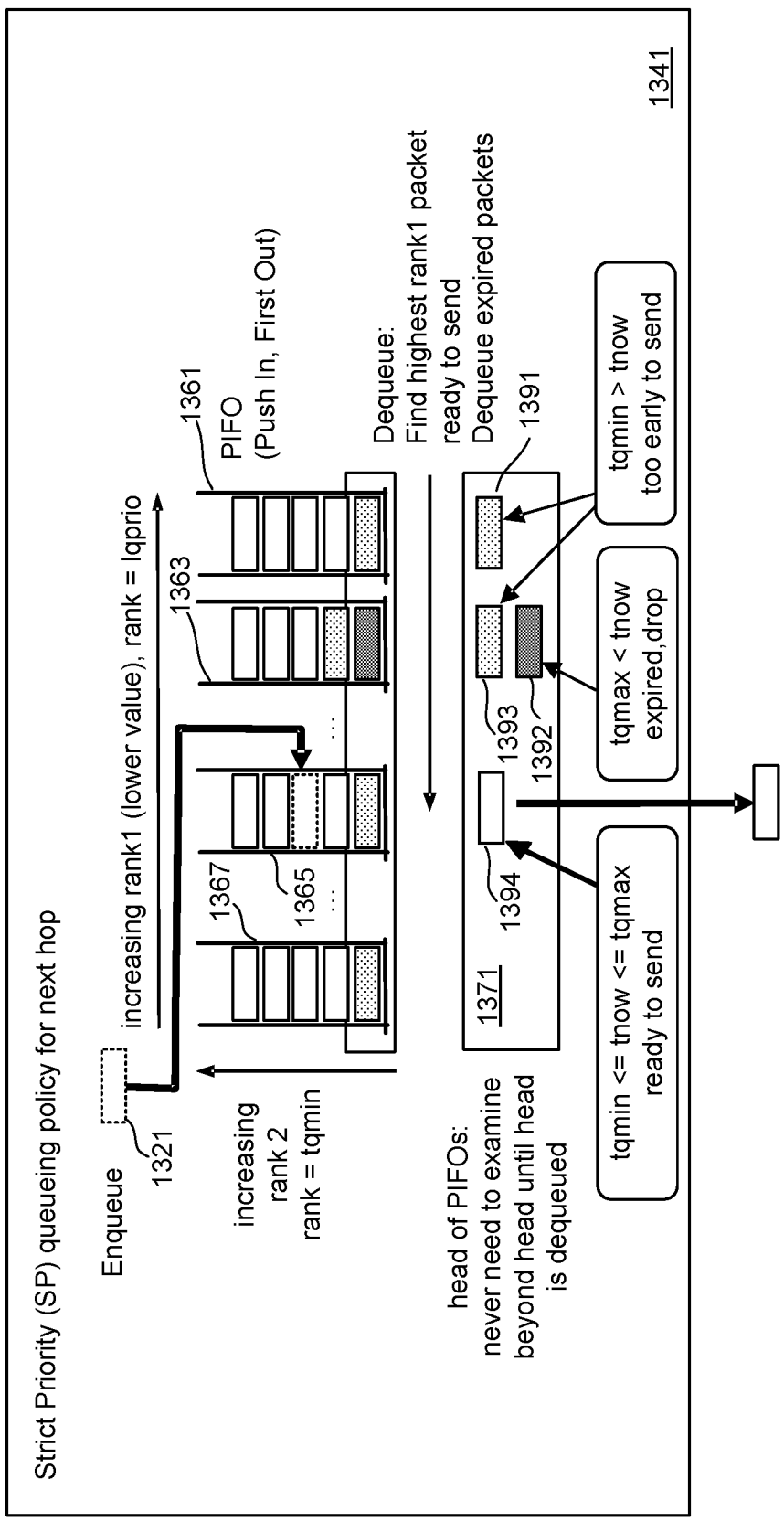

Under prior queueing techniques for packets, at each of ring routers (RA 501, RB 503, RC 505, RD 507, RE 509, RF 511) 99 packets, one for each other spoke router (e.g.: Ra1 501-1, . . . , Ra99 501-99) could arrive simultaneously (assuming all links have same speed). Without indicated minimum latencies for the packets, there is no mechanism for a router to establish which packets could be relatively delayed and no way to order the transmission of these packets. Consequenity, some packets that could be delayed and still stay on budget may end up being queued in front of more urgent packets. The latency based forwarding introduced here allows for a packet with a lower delay SLO to be de-queued earlier than packets with a higher delay SLO. Under the latency based aproach, because each hop and queuing of prior hops reduces the acceptable per-hop delay, packets which have to cross more ring nodes would experience less per-hop delay in the nodes than those packets with the same SLO but travelling fewer hops. The latency based SLO therefore can provide fairer/more-equal delay across rings independently of how far away in the ring a sender and receivers are located. For example, minimum-delay can be set to be larger than the worst-case "across-ring" delay which results in same delivery latency independent of path in the absence of congestion. This only requires the simple LBF queuing option described with FIG. 9, in which dequeuing prioritization only considers lb (lower bound SLO). When the more comprehensive LBF option described below with respect to FIG. 13 is used, then dequeuing will also prioritize packets under observation of ub (upper bound LBF), prioritizing packets with different path-lengths and SLO when under congestion.

Figure 6:
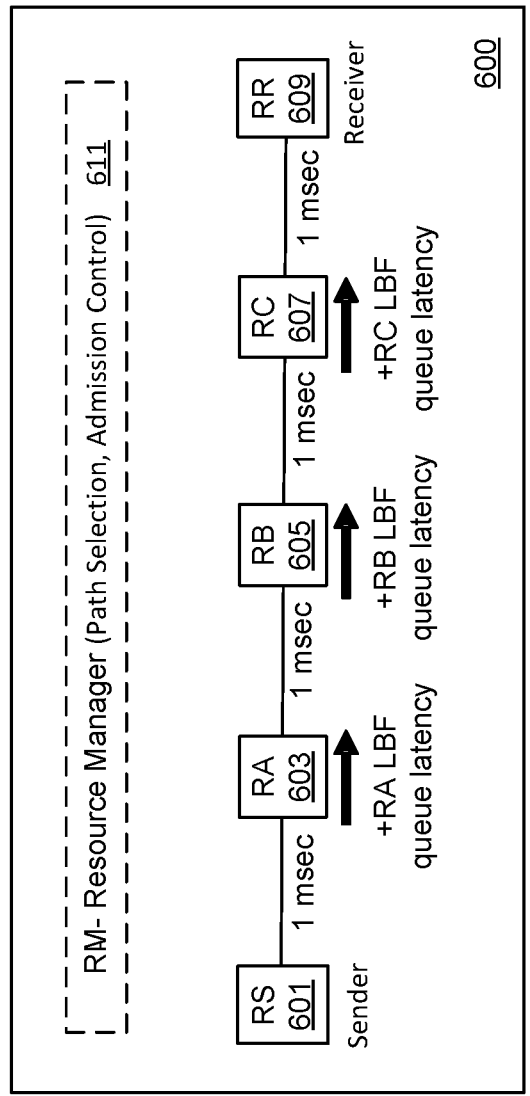
FIG. 6 is a high level overview for an embodiment of end-to-end latency based forwarding.
Figure 6:
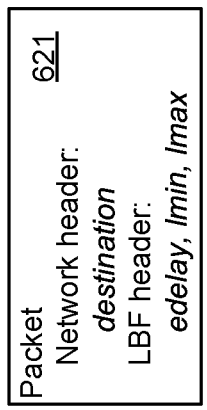

FIG. 6 is a high level overview for an embodiment of end-to-end latency based forwarding (LBF) 600. As shown in FIG. 6, latency based forwarding provides a machinery for an end-to-end network consisting of a sending network device, or sender, RS 601, receiving network device, or receiver, RR 609 and one or more intermediate or forwarding nodes. In FIG. 6, three intermediate nodes RA 603, RB 605 and RC 607 are shown. In FIG. 6, the fixed latency for transmission between a pair of nodes is 1 ms, and each of the intermediate nodes adds a delay of an LBF queue latency. In this way the locally incurred latency at the node is added to the total delay incurred so far, so that it can be used by the subsequent node as one of the inputs to make its decision. As a result, the total end-to-end latency between the sending router or node RS 601 and the receiving router or node RR 609 is managed.

A packet 621 includes a destination header that indicates its destination, RR 609 in this example. This destination header is used by each forwarding node RA 603, RB 605, RC 607 to steer packet 621 to the next forwarding node or final receiver RR 609. In addition to the network header, for latency based forwarding packet 621 adds three parameters to a forwarding header: edelay, lmin and lmax. Although the present discussion is primarily based on an embodiment where this forwarding metadata is carried by a forwarding, or LBF, header, in alternate embodiments the forwarding, of LBF, metadata can be in a packet that can, for example, be coupled with a command in an internet protocol. The edelay parameter allows for each forwarding node (RA 603, RB 605, RC 607) to determine the difference in time (latency) between when the node receives the packet and when the sender RS 601 has sent the packet. In one set of embodiments, the edelay parameter is the latency, or delay, encountered so far. It is updated at each node, which adds the latency locally incurred so far plus the known outgoing link latency to the next hop. In another set of embodiments, a sender timestamp is added once by the sender RS 601, where subsequent nodes compute the latency (edelay) incurred so far by subtracting the sending timestamp from the current time. In the sender timestamp embodiments, the forwarding nodes RA 603, RB 605, RC 607 do not need to update the field, but this method does require a time-synchronized network. In other alternate embodiments, a desired time of arrival could also be indicated. The parameters lmin and lmax are respectively an end-to-end minimum and maximum latency for the Service Level Objectives (SLO). The latency with which the final receiving node RR 609 receives the packet is meant to be between the minimum and maximum latency values lmin and lmax.

Figure 7:
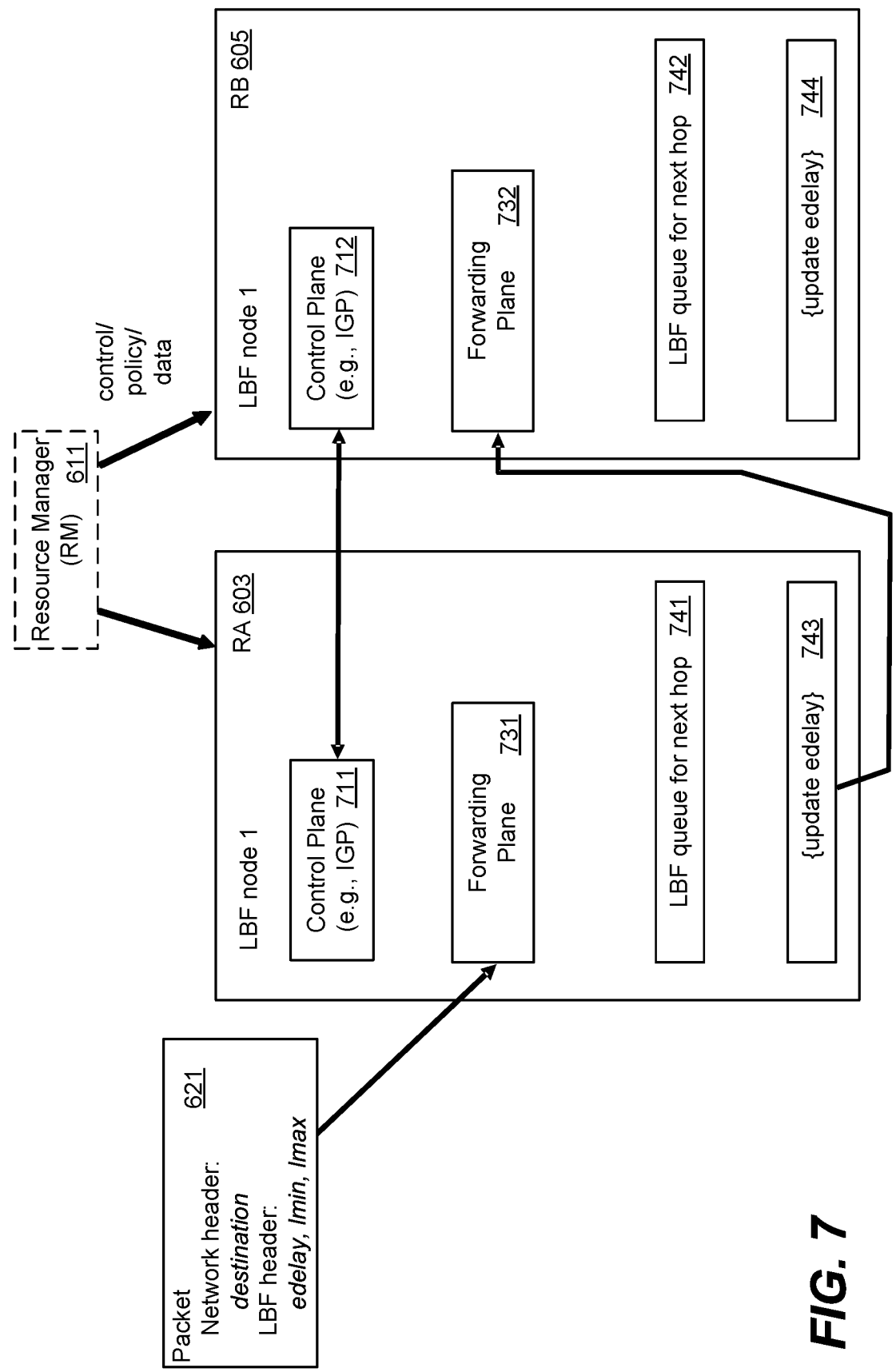
FIG. 7 considers the node behavior for a pair of nodes from FIG. 6 in more detail.

FIG. 7 considers the node behavior for a pair of nodes from FIG. 6 in more detail. FIG. 7 illustrates two of the latency based forwarding nodes of FIG. 6, such as RA 603 and RB 605, and the resource manager 611. Each of the nodes RA 603 and RB 605 includes a control plane 711, 712 (such as based on an internet gateway protocol, IGP), a forwarding plane 731,732 and a latency based forwarding protocol queue or queues 741,742 in which the packets are placed for the next hop.

As shown in FIG. 7, embodiments of latency based forwarding can be very generic in describing how forwarding nodes RA 603, RB 605, RC 607 can achieve this forwarding goal. A centralized resource manager 611 can provide control/policy/data to forwarding nodes RA 603, RB 605, RC 607 and/or a distributed mechanism. In some embodiments, the number of hops from the current node to the destination and/or the minimal latency to the destination can be accessed, such as by being communicated by a "control plane" 711,712 (e.g., a protocol such as IGP or provisioned through a controller, for example). In some embodiments, this information can be added to a forwarding information database, or FIB, along with other information such as the next hop. A forwarding plane 731, 732 can be used to help steer the packet 621 on every forwarding node to the next-hop according to the packet's destination parameter. With the LBF queue for the next hop 741, 743, the packets will have updated edelay values 743, 744 that are provided to the forwarding plane of the next LBF node. A packet can be entered into the queue based on its delay budget. If the edelay value of a packet is over the maximum latency, the packet can be discarded. Depending on the embodiment, the LBF queue for the next hop 741, 743 can be one or multiple queues and, for embodiments with multiple queues, the queues can be ranked or un-ranked.

The latency based forwarding machinery described with respect to FIG. 7 cab be broadly implemented and sufficient to build vendor proprietary end-to-end networks with latency based forwarding. However, it may be insufficient to build interoperable implementations of the nodes, such as RA 603 and RB 605 of FIG. 7, if both forwarding nodes are from different vendors and do not agree on a common policy. It can also be insufficient to allow for a third-party resource manager 611 to calculate the amount of resource required by latency based forwarding traffic and the delay bounds practically experienced by traffic flows based on the load of the traffic. Additionally, it may be insufficient to define extensions to distributed control planes 711, 712 to support latency based forwarding operations and also insufficient to establish a generic extendable framework for programming different LBF policies, especially if programming of LBF nodes is made available to third-parties.

To overcome these situations, the following embodiments introduce latency based forwarding destination policies. These policies can enable parallel use of multiple end-to-end LBF policies in multi-vendor or standardized environments. The destination policies can also enable accurate calculation and prediction of latencies and loads by external controller/admission systems.

The embodiments presented below introduce a "policy" parameter or metadata field into a packet's LBF packet header. The process can use per-destination egress queuing policy parameters ("LBF_dest_parameters") that can be attached to a destination forwarding database (forwarding information base, or FIB). A published or external API can be used to populate the LBF_dest_parameters. The embodiments can introduce a function ("LBF_queuing_policy") to map from LBF_dest_parameters to enqueuing LBF queue parameters, which can be designed to exploit a programmable Forwarding Plane Engine (FPE). A published or defined "LBF queuing policy" can be designed to expect/assume a "PHB" (Per Hop Behavior) as used for standardized "queuing" behavior specifications. Examples of LBF destination policies can include an Equal Share Lmin Destination (ESLD) LBF policy function and the flooding of configured/measured link propagation latency as a new IGP parameter.

Figure 8:
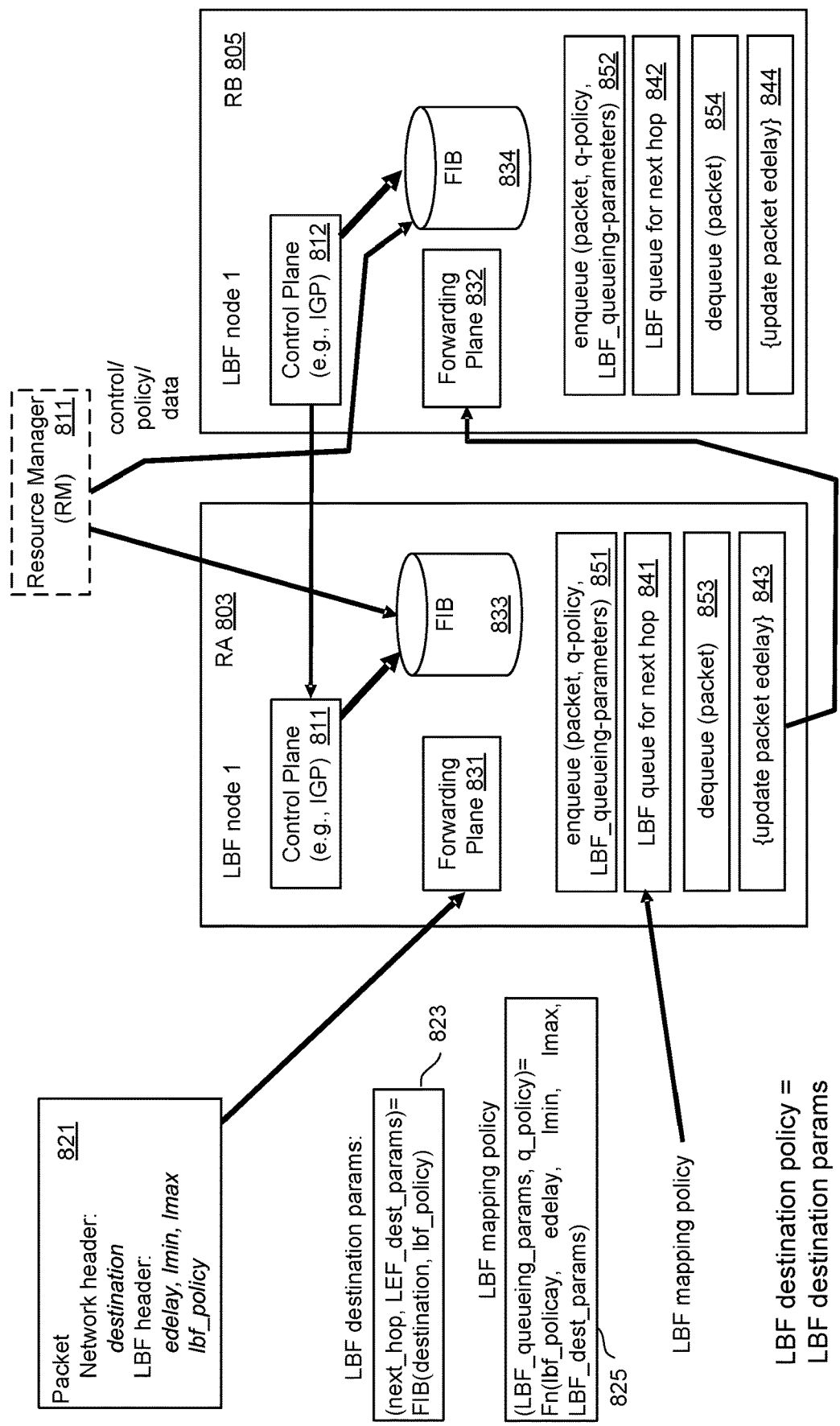
FIG. 8 illustrates the use of destination policies for latency based forwarding of packets and an embodiment for node behavior and node components.

FIG. 8 illustrates the use of destination policies for latency based forwarding of packets and an embodiment for node behavior and node components. FIG. 8 again shows a pair of LBF nodes RA 803 and RB 805 and a resource manager 811. Each of LBF nodes RA 803, RB 805 again includes a control plane 811, 812, a forwarding plane 831, 832, the LBF queue for next hop 841, 842, and also represents the updating of the packet's delays at 843, 844. Relative to FIG. 7, each of LBF nodes RA 803 and RB 805 now also includes a destination forwarding database, or FIB (forwarding information base), 833, 834 and also schematically represents the enqueueing of packets at 851, 852 and the dequeuing of packets at 853, 854.

A packet 821 again includes a network header, indicating a destination for the packet, and an LBF header indicating the parameters edelay, lmin, and lmax. Additionally, the LBF header of packet 821 now also includes a parameter indicating an LBF destination policy, lbf_policy. As is discussed in more detail below, an LBF destination policy can include one or more of LBF destination parameters, as illustrated at 823, an LBF mapping policy, as illustrated at 825, LBF queueing parameters, and an LBF queueing policy.

The elements of the embodiment of FIG. 8 added relative to the embodiment of FIG. 7 can be used to implement the destination policies for the latency based forwarding of packets. For example, entities independent of forwarding nodes, such as a centralized Resource Manager 811 can calculate for each node and each required destination the policy and destination specific LBF_dest_params 823 and send them to each node, where they are remembered for later use by the forwarding plane 831, 832, which is commonly in a component usually called the FIB 833, 834. In another example, a distributed control plane protocol implemented in control plane 811, 812 on every LBF forwarding node can perform the calculation of the LBF_dest_params for each required destination and send the result to the FIB 833, 834.

To consider one embodiment further, the distributed control plane protocol can be a so-called SPF (Sender Policy Framework) protocol like OSPF (Open Shortest Path First) or ISIS (Intermediate System to Intermediate System). The SPF calculation can be performed as follows:

a) The SPF protocol configuration on each LBF forwarding node is extended in support of LBF by the physical latency of each outgoing interface/next-hop to which LBF is to be supported. Optionally, this can be refined by fixed processing delays by this node set automatically or through configuration.

b) Each SPF protocol floods its interface's physical latency through an appropriate extension message of the IGP.

c) When performing the SPF calculation, in addition to calculating the shortest path/metric to each destination, the control plane also adds up the physical latency of each hop for the path to the destination. This sum becomes the "todelay" LBF_dest_parameter. The total number of hops on the shortest path to the destination becomes the "tohop" LBF_dest_parameter.

With these two LBF_dest_parameters (todelay, tohops), an Equal Share Lmin Destination (ESLD) LBF policy as described below can be supported. This embodiment is a dependency of the overall system and can enable parallel use of multiple end-to-end LBF policies in multi-vendor or standardized environments.

Considering the operation of the forwarding plane 831, 832, when a packet 821 is received by an LBF forwarding node such as RA 803, it is processed by a component called here the forwarding plane 831. The forwarding plane 831 can use the destination field from the packet 821 to perform from the FIB 833 the next_hop lookup and the newly introduced LBF_dest_params lookup for the destination 823. The forwarding plane 831 then performs the calculation illustrated at 825 to calculate the LBF_queuing_params, where the formula for this function depends on the policy.

The forwarding plane 831 then enqueues the packet 821, together with the LBF_queuing_params and the lbf_policy represented at 851, into the LBF queue for the next hop 841.

The mechanisms for the control plane 811, 812 and forwarding plane 831, 832 described above enable support of multiple different LBF policies simultaneously. The queuing policy for a specific packet is determined by the packet 821 lbf_policy, which is an identifier for the policy. Any destination LBF policy can be constituted of: The control plane mechanisms necessary to derive the LBF_destination_params; the algorithm 825 to calculate LBF_queuing_params from LBF_destination_params and packet LBF parameters; and the behavior of the LBF queue, defined by the behavior for dequeuing 853, 854. The following describes these aspects for an Equal Share Lmin Destination, or ESLD, LBF policy embodiment, where the name is chosen to indicate that this policy is primarily concerned about managing lmin, but only does minimal support for lmax.

In an ESLD LBF policy embodiment, the LBF parameters 823 used during destination lookup by the forwarding plane 831 into the FIB 833 are as follows:

LBF_dest_params: todelay, tohops

As described above, these parameters can be derived from centralized or distributed control plane functions. The LBF queuing parameters 825 that are attached to the packet when sending it to the LBF queue 841 can be as follows:

LBF_queuing_parameters: tqmin, tqmax, where tqmin and tqmax are respectively a minimum and a maximum queueing time.

The ESLD function 825 mapping from LBF_dest_params and packet 821 parameters to LBF_queuing parameters can be as follows:

$$tqmin = max(tnow+(lmin-edelay-todelay)/tohops, tnow)$$

$$tqmax = tnow+(lmax-edelay-todelay)/tohops$$

if(tqmax<0)→LBF early packet discard

In the above, tnow is the time at which 831 performs the calculation, which is the time when packet 821 is enqueued into the LBF queue 841. The LBF early packet discard function is included for completeness, as the LBF queuing policy may be assumed to expect that tqmin>=tnow and tqmax>=tnow.

In the described embodiment for ESLD, the dequeuing policy 853 can operate in the abstract starting when a packet is received with tqmin and is buffered by the LBF queue until tnow=lmin. At tnow=lmin, the packet is passed on to a FIFO queue from which packets are dequeued as soon as the outgoing interface to the next-hop can send another packet. Other embodiments can be used, but this is the simplest queuing behavior in router/switches. When at tsend the packet could be sent to the outgoing interface, and when tsend>tqmax, the packet is discarded or, alternately, the packet can be marked with a notification that it has already exceeded its maximum latency and then sent.

Figure 9:
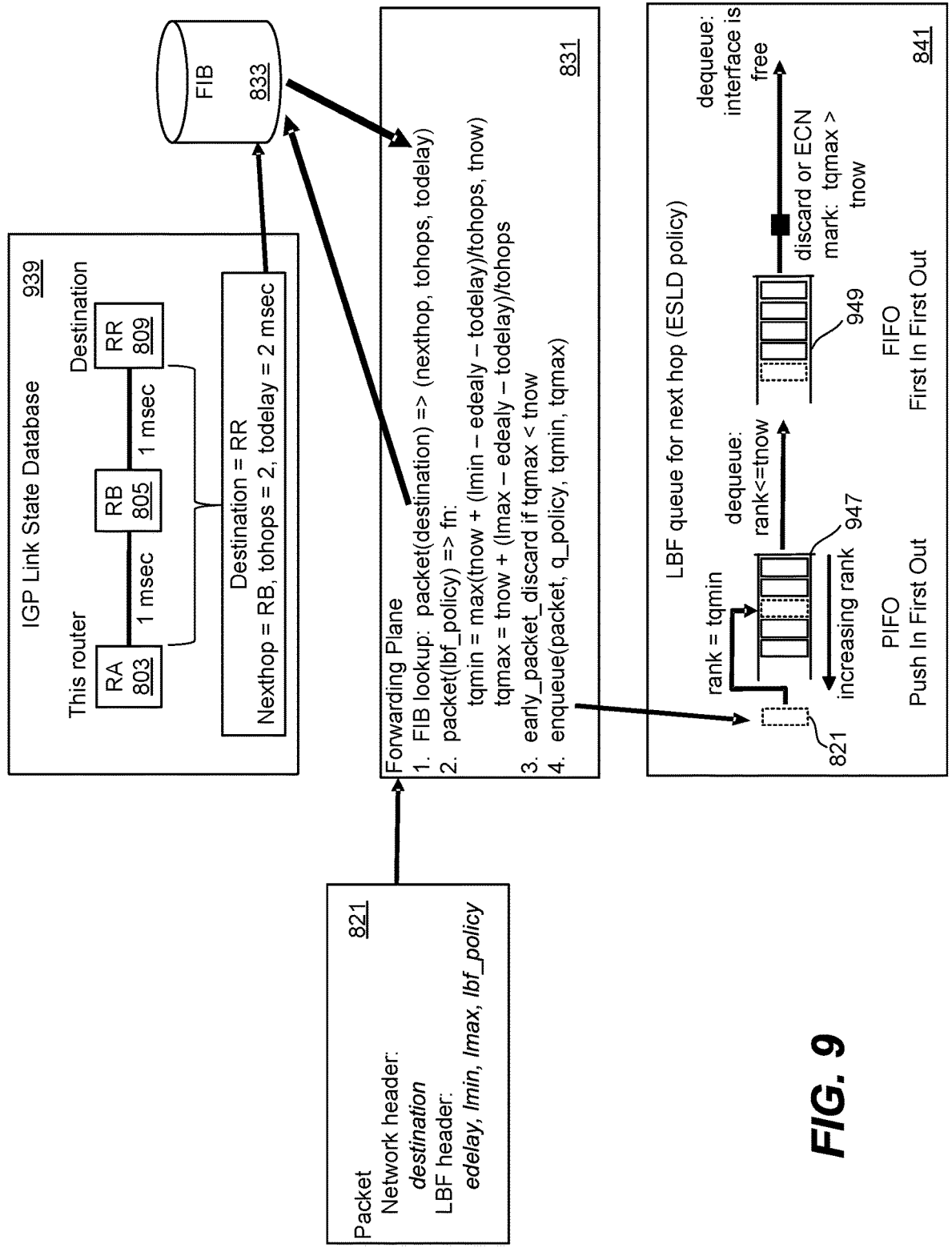
FIG. 9 is a schematic representation of an embodiment for latency based forwarding of packets using an equal share minimum latency value destination policy.

FIG. 9 is a schematic representation of an embodiment for latency based forwarding of packets using an equal share lmin destination policy. An IGP link state database 939 is represented schematically for the current node of router RA 803 and next hop RB 805 and destination RR 809, for a total of two hops. In this example, the fixed pair-wise latency between each of these is 1 ms. This corresponds to the data base information of: Destination=RR; Nexthop=RB, tohops=2; and todelay=2 ms. This information is supplied to the forwarding database FIB 833.

The forwarding plane 831 receives the packet, extracts the packet's destination, performs a FIB lookup, and receives back from the FIB 833 the nexthop, tohops, and todelay values. The forwarding plane 831 also extracts the LBF policy from the packet to obtain the function or functions (fn) to be used for the LBF mapping policy. In the ESLD embodiment, the computations include a minimum and a maximum queueing time:

$$tqmin=\max(tnow+(lmin-edelay-todelay)/tohops, tnow)$$

$$tqmax=tnow+(lmax-edelay-todelay)/tohops$$

In the embodiment illustrated in FIG. 9, an early packet discard is included if the packet will not be able to meet its maximum latency, tqmax<tnow. The packet 821 can then be enqueued into the LBF queue 841 based on the packet's queueing policy (q_policy), its tqmin value, and tqmax value.

The LBF queue 841 can be part of the one or more queues 450 of FIG. 4. The packet 821 is ranked based upon a rank=tqmin, and can then be inserted in the queue of PIFO (Push In First Out) 947 based on its rank. The packets in PIFO 947 are then passed into FIFO (First In First Out) 949, being dequeued from the PIFO 947 based on the rank being less than or equal to tnow. The packets, including packet 821, in the FIFO 949 can then be dequeued when the interface (i.e., transmitter 432 and I/Os 430 of FIG. 4) is free. If a packet in FIFO 949 has tqmax>tnow, it will not meet its lmax and it can be discarded or marked with a notification.

Other embodiments can use LBF policies other than ESLD, but ESLD illustrates an embodiment to provide a complete working machinery for implementing LBF destination policies. ESLD can have the benefits of a simple implementation, splitting up buffering equally across each hop and removing the need for high-buffering on the receiver or last-hop router, and can reduce burstiness across multiple hops incrementally on every hop.

As described above, the use of destination policies for latency based forwarding provides the ability to define the LBF policies well enough so that they can be used in conjunction with resource management systems. Embodiments for implementing LBF policies with low levels of complexity in high speed forwarding hardware can be implemented through the components of an extension to FIB lookups and simple calculations to derive queuing parameters.

The extension to FIB lookups allows latency based forwarding to function by only requiring parameters to be attached to the FIB, which can be a convenient way to implement LBF in high-speed router or switch hardware. The term FIB is used here because it is well recognized in the industry, but, more generally, this is not meant to imply assumptions made as to how it works or is implemented, other than that it is expected to act as an interface that allows the system to derive LBF_parameters from a lookup of a packet's destination. Setting up these destinations in the LBF_parameter mappings is something that, for example, can be supported externally through a third-party PCE (Path Computation Element) or controller, or that could be part of a standards specification of an extension to a distributed routing protocol like OSPF or ISIS.

With respect to the simple calculations (in, e.g., the P4 programming language) to derive queuing parameters, the parameters that can be attached to destination lookups alone could make it very difficult to directly build a queue. Instead, one readily feasible design in high speed forwarding hardware is to leverage the programmability of the forwarding engine to calculate the queuing parameters from which the actual queueing behavior can be defined. The calculations described above for ESLD are easily programmed in the P4 forwarding engine programming language, for example.

Next, the extension of latency based forwarding destination policies is extended to "strict priority destination" (SPD) policies. These SPD polices extend the destination polices described above to further take into account the maximum latencies of a packet in the forwarding process. The usefulness of such policies can be illustrated with respect to FIG. 10.

Figure 10:
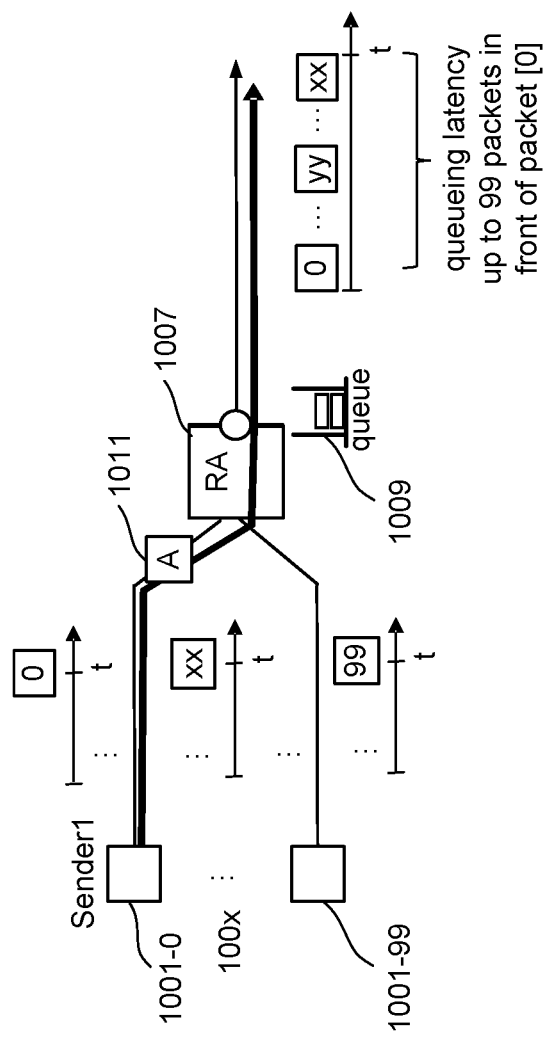
FIG. 10 is a schematic diagram of multiple nodes connected to serve as inputs to a single node, which can lead to burst accumulation of packets at the receiving node.

FIG. 10 is a schematic diagram of multiple nodes connected to serve as inputs to a single node, which can lead to burst accumulation of packets at the receiving node. In FIG. 10, a node, such as router RA 1007, has a large number (here, 100) input nodes or routers 1001-1, . . . , 1001-99 that all can send traffic that will end up on a queue 1009 of outgoing interface. Of interest here is a traffic flow 1011 from 1001-1 and the latency that the queue 1009 of the outgoing interface may introduce to it.

In prior asynchronous queuing mechanisms, it cannot be avoided that a packet can arrive simultaneously on every incoming interface. This can then result in the worst case in which queue 1009 is queueing up 100 packets and de-queuing them. In none of the prior queuing schemes is there a way to order this de-queuing such that packets with less of an effective latency budget for reaching the destination will be preferred over packets that have more of a remaining latency budget. The situation can be considered further by looking at a typical use-case as presented in FIG. 11, which may be a metropolitan aggregation network, such as a so-called "market network" of an MSO (Multi Service Operator), Backhaul Network of a Mobile Operator or the whole network of a metropolitan operator.

Figure 11:
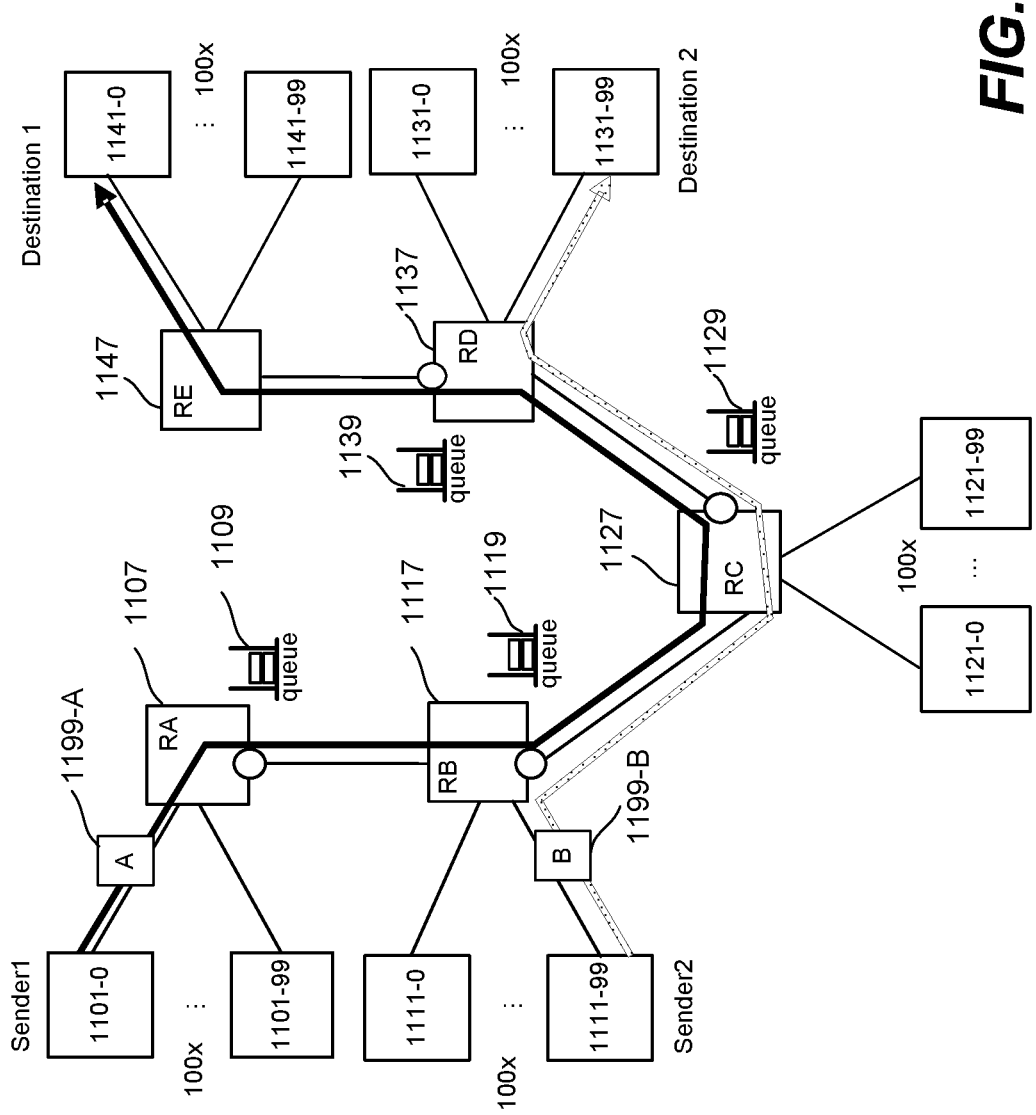
FIG. 11 illustrates the forwarding of two traffic flows through an aggregation network of five nodes.

FIG. 11 illustrates the forwarding of two traffic flows through an aggregation network of five nodes of the routers RA, . . . , RE (1107, 1117, 1127, 1137, 1147). Each of these aggregation routers has 100 connecting routers: 1101-0, ..., 1101-99 for router RA 1107; 1111-0, ..., 1111-99 for router RB 1117; 1121-0, ..., 1121-99 for router RC 1127; 1131-0, ..., 1131-99 for router RD 1137; and 1141-0, ..., 1141-99 for router RE 1141-0. FIG. 11 considers two traffic flows, [A] 1199-A from router 1101-0 to router 1141-0 and [B] 1199-B from router 1111-0 to router 1131-0.

Flow [A] 1199-A has to pass through 4 queues (1109, 1119, 1129, 1139) in which it can accumulate (as explained with respect to FIG. 10) up to 99× the latency introduced by serializing one packet. Flow [B] 1199-B only has to pass through 2 queues (1119, 1129) where it can accumulate this amount of latency, so [B] 1199-B has to suffer through less possible queuing latency than flow [A] 1199-A.

If a network provider wants to offer very low latency services through this network, then the absolute latency it can offer is highly dependent on the point of attachment of senders and receivers. Without an arrangement such as that presented here, the service latency possible for flow [A] 1199-A would be much worse than that that could be offered for flow [B] 1199-B, and this highly varying degree of service guarantees for flows with different points of attachment to the network makes it hard to effectively offer and plan for these services. It also does not allow offering of the best possible (i.e., lowest latency) services for the worst possible paths.

One reason for the difference in low-latency quality experience between flow [A] 1199-A and flow [B] 1199-B is the difference in the propagation delay because flow [A] 1199-A has to pass through two more links (link from RA 1107 to RB 1117 and link from RD 1137 to RD 1147) than flow [B] 1199-B. The latency based forwarding techniques described so far can address this issue because the network operator could ensure that flow [A] 1199-A and flow [B] 1199-B have an end-to-end lmin SLO that would be larger than the worst path (the one for flow [A] 1199-A). As a result, the latency based forwarding processing for lmin would ensure that flow [B] 1199-B would be delayed to not be faster than flow [A] 1199-A. However, the latency based forwarding destination policy described so far does not help to overcome the problem described for FIG. 10: For example, with the Equal Share Lmin Destination (ESLD) policy, both flow [A] 1199-A and flow [B] 1199-B flows would need to account for the 99× latency introduced by each of the considered queues.

The following discussion defines an LBF destination policy that allows the network to reduce the maximum queuing latency for the problem described for FIGS. 10 and 11 when the competing flows differ in their LBF SLO. For example, considering the queuing delay for flow [A] 1199-A on queues 1119, 1129 and 1139, the fact that the number of queuing hops and physical propagation of a path from router A to router E is higher/larger than that of any other path crossing through these queues will allow for this traffic to be automatically prioritized and guarantee lower maximum latency for flow [A] 1199-A. More specifically, the following introduces a new LBF destination policy called "strict priority destination" (SPD) that manages queuing latency created by burst loads as described above, improving the latency based forwarding ESLD policy which simply relies on a FIFO to manage these queuing burst latencies. The embodiments described can be targeted to improve maximum latency in explicitly admitted/managed traffic such as in Time-Sensitive Networking (TSN)/Deterministic Networking (DetNet) and similar environments.

In addition to the previously introduced LBF queueing parameters of tqmin and tqmax, the strict priority destination queueing policy introduces an additional local queueing priority, lqprio. Consequently, the SPD LBF queuing policy has three LBF_queuing_params: tqmin, tqmax and lqprio. The SPD LBF queuing policy achieves the following externally observable queuing behaviors:

1) Packets are never de-queued/sent before their tqmin time;
2) Packets are not sent, but discarded if they cannot be sent at or before their tqmax time; and
3) When at any point in time the outgoing interface (or other further queue) can accept another packet, the packet sent will be the packet that has: a) the smallest lqprio, and amongst those a) packets, the one packet with the earliest tqmin that also meets point 1 and 2.

Points 1 and 2 are common with the ESLD queueing policy, the point 3 is newly introduced for strict priority destination policies.

Actual implementations may not achieve 100% accuracy of these desired external observation points due to factors such as timing inaccuracies or approximating this behavior through price optimized implementations, but an implementation that approximates this observable external behavior under a variety of traffic loads can be considered to be an implementation of this target external behavior. In one set of embodiments, the destination policies described above can be combined with the following defined components to create the "strict priority destination" (SPD) policy:

1) The LBF destination parameters are the same as in ESLD of LBF: todelay and tohops;
2) The LBF mapping policy to calculate tqmin and tqmax is the same as in ESLD of LBF; and
3) lqprio=tqmax−tqmin.

The SPD LBF policy can be used to not only process packets with LBF SLO parameters (lmin, lmax, edelay), but also best-effort packets without these parameters. Packets without these parameters can be enqueued into the SPD queue with tqmin=tnow (where tnow is the enqueuing time), tqmax=MAXQUEUE and lqprio=MAXBUDGET, where MAXQUEUE and MAXBUDGET are higher than the maximum supported values for tqmx and lqprio derived from packets with LBF SLO parameters. This assumes that there is a system-wide lower limit on the packets lmin, lmax parameters: for example, lmin, lmax<50 ms, hence MAXQUEUE=MAXBUDGET=50 ms.

To provide an example of the SPD queuing and policy and its benefits, an example in which it is applied to the situation of FIG. 11 can be considered. For this example, all of the links in FIG. 11 are taken to be 100 mbps and have a physical propagation latency of 100 μsec. Packets of flow [A] 1199-A and flow [B] 1199-B are given an lmin of 0 μs and an lmax of 1000 μs. When flow [A] 1199-A and flow [B] 1199-B packets are enqueued into router RB 1117 and outgoing interface SPD queue 1119 did not have any queuing latency incurred previously, their parameters will be:

[A] packet: edelay=200 [usec], lmin=0, lmax=1000 [usec]
    dest params: todelay=400 [usec], tohops=4,
    queue params: tqmin=tnow
        tqmax=(lmax−edelay−todelay)/tohops=100+tnow
        lqprio=100
[B] packet: edelay=100 [usec], lmin=0, lmax=1000 [usec]
    dest params: todelay=300 [usec], tohops=3,
    queue params: tqmin=tnow
        tqmax=(lmax−edelay−todelay)/tohops=200+tnow
        lqprio=200

As a result, the SP queuing policy will always dequeue flow [A] 1199-A packets before flow [B] 1199-B packets and ensure that any queuing delay is shifted to flow [B] 1199-B packets because lqprio of flow [A] 1199-A is higher (lower value) than lqprio of flow [B] 1199-B.

If all 100 nodes 1111-0, . . . , 1111-99 would have traffic flows with similar SLO parameters as flow [B] 1199-B, then even with the furthest destination being in a node 1141-0, . . . , 1141-99, they would not have an lqprio as low as flow [A] 1199-A and therefore would be dequeued after flow [A] 1199-A. As a result, flow [A] 1199-A would have only a queuing latency of one packet (in transit) vs. 99 packets on queue 1119.

Figure 12:
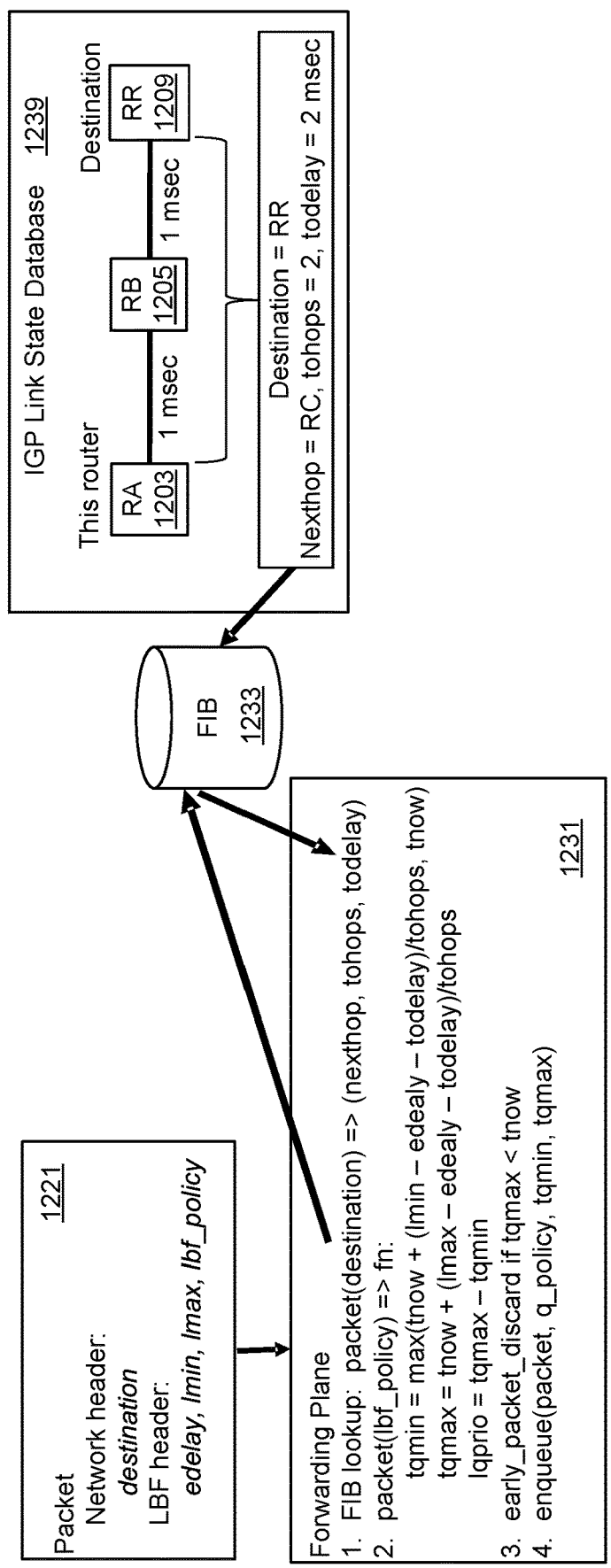
FIGS. 12 and 13 are a schematic representation of an embodiment for latency based forwarding of packets using strict priority destination policy.

FIGS. 12 and 13 are a schematic representation of an embodiment for latency based forwarding of packets using strict priority destination policy. FIGS. 12 and 13 repeat many of the elements of FIG. 9, and include similarly numbered elements (i.e., 1239 and 939 for the IGP link state database), but now for an embodiment with a strict priority destination policy.

FIG. 12 corresponds to the upper part of FIG. 9, where the packet 1221 corresponds to the packet 821, the FIB 1233 corresponds to the FIB 833, the IGP link state database 1239 corresponds to (and has the same example values) as IGP link state database 939, and forwarding plane 1231 corresponds to forwarding plane 831, except now the parameters include the local queueing priority lqprio.

FIG. 13 presents a strict priority queueing policy for the next hop 1341 that replaces the LBF queue 841 of the lower part of FIG. 9. FIG. 13 now illustrates multiple queues 1361, 1363, . . . , 1365, . . . , 1367, where the packets in each of the queues are ranked on a rank2, corresponding to tqmin, and the different queues are ranked according to a rank1, corresponding to lqprio. The packets are dequeued by finding the highest rank1 packet ready to send and where expired packets are dequeued.

As illustrated in the embodiment of FIG. 13, there is a PIFO (1361, 1363, . . . , 1365 . . . , 1367) for each lqprio or bins of lqprio values, with the PIFO queues ranked (rank 1) by lqprio. In FIG. 13, all packets in PIFO 1361, for example, have the lowest lqprio value=highest priority. Within each PIFO, tqmin is the rank function (rank 2), so packets get inserted in the order of their tqmin target dequeuing time. The de-queuing function only need examine the top packet in each PIFO. The de-queuing function attempts, at each point in time when it can send a packet, to dequeue the highest priority (lowest lqprio value) head of PIFO packet for which tqmin tnow tqmax. When any PIFO head has an expired packet (tnow>tqmx), then that packet is discarded and the next packet (now head of that PIFO) is examined.

FIG. 13 shows an example of this algorithm: 1371 are the head-of-PIFO packets. The de-queuing function first examines 1391, but determines it cannot yet be sent (tnow>tqmin). The dequeue function then examines 1392 and finds it to be expired. It discards 1392. It then examines 1393 and finds that it cannot yet be sent. It then examines 1394 and finds that it can be sent. Finally, 1394 is de-queued and sent.

Figure 14:
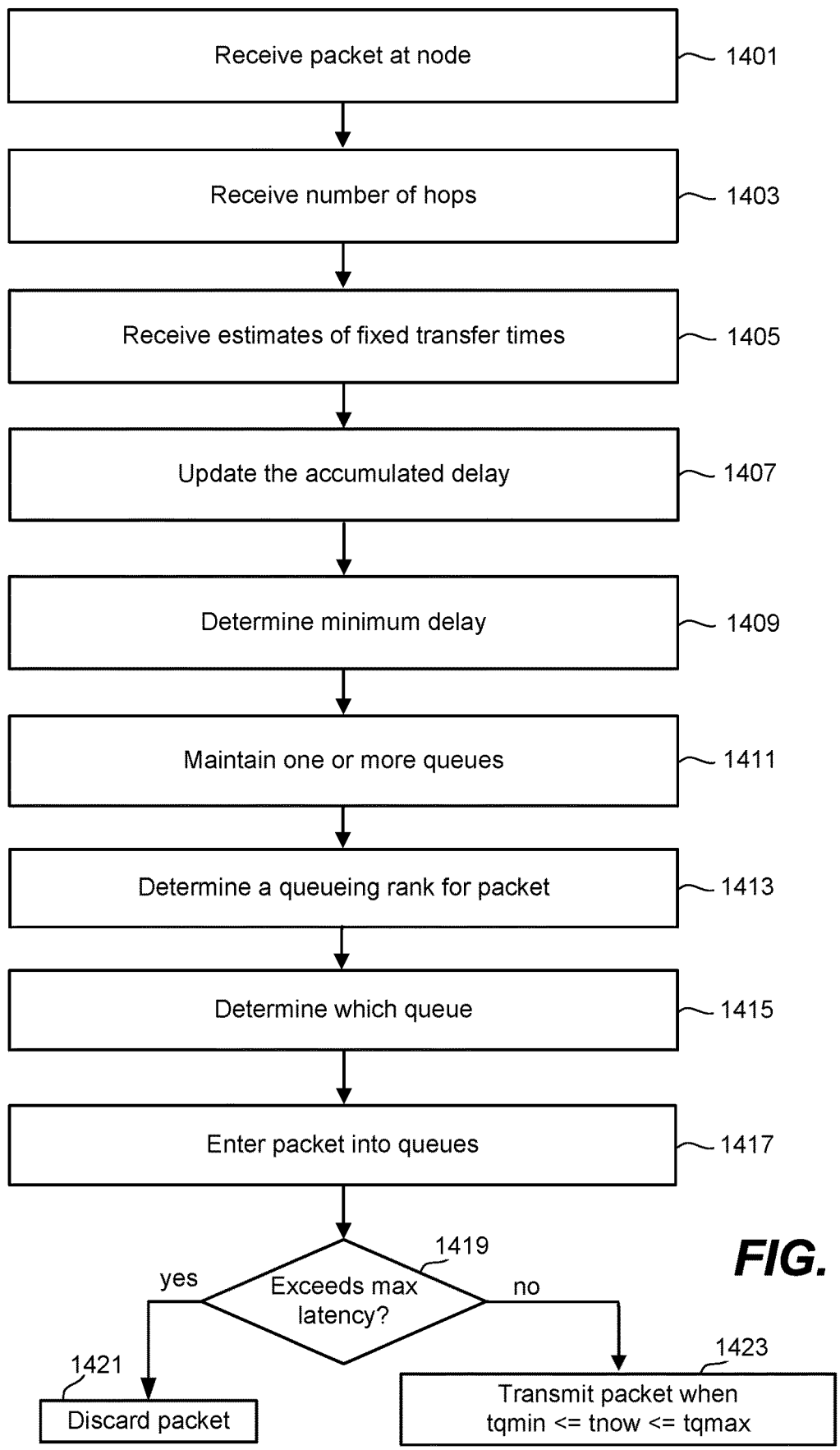
FIG. 14 is a flowchart of one embodiment of the operation of latency based forwarding that can include destination policies and also strict priority destination policies.

FIG. 14 is a flowchart of one embodiment of the operation of latency based forwarding that can include destination policies and also strict priority destination policies. Starting at 1401, a router or other network node receives an LBF packet, such as 821 or 1221, that has both a network header and an LBF header. Based on this information, a FIB 833, 1233 can determine the number of hops and estimates of the fixed transfer times from the database 939, 1239. The node receives the number of hops at 1403 and the estimates of fixed transfer time 1405, where, although typically both of these pieces of information are received from the FIB 833, 1233 together, they are separated into 1403 and 1405 for purposes of this discussion.

At 1407, the node can update the accumulated delay that the packet has experienced so far since it has left the sender and, at 1409, a minimum delay is determined for the packet. The minimum delay, tqmin, can be determined as described in the embodiments presented above, where, depending on the embodiment, a maximum delay tqmax and a local queue priority lqprio can also be established. Although shown in a particular order in FIG. 14 for purposes of this discussion, many of the steps can be performed in other orders. For example, any of steps 1403, 1405, 1407, and 1409 can be performed in differing orders and even concurrently depending on the embodiment.

The node 1411 maintains, at 1411, one or more queues as represented at 841, 1341, and 450, for example. Based on the parameters from 1409 (one or more of tqmin, tqmax, and lqprio), a queuing rank is determined for a packet (as illustrated in 841 and, for rank2, in 1341) at 1413. For embodiments with multiple queues for the packets, as illustrated in 1341, a queue is determined for the packet at 1415, where in the example illustrated in FIG. 13 this can be based on rank1. Once the queue and place within the queue are determined, the packet is entered into the determined queue and location at 1417.

Once entered into to a queue, the packet can be transmitted at 1423. For example, in the embodiment illustrated with respect to 841 in FIG. 9, the packet will be forwarded when it gets to the front of the FIFO 949; and in FIG. 13, this will occur when tqmin≤tnow≤tqmax as discussed above with respect to 1341. Before forwarding, in some embodiments the packet is checked at 1419 to see whether it has exceeded its maximum latency and, if so, discarded at 1421. In other embodiments, a late packet can be marked as such and still transmitted at 1423.

The techniques described above allow for the ability of congestion (burst) management of lmax (maximum end-to-end latency), by shifting queuing delay proportionally to each flow based on its queuing budget. The queuing budget is then used as the priority parameter in the SPD queuing. The latency based forward techniques can also play an important role in addressing concerns about absolute maximum end-to-end latency, Time-Sensitive-Networking and Deterministic Networking. As mentioned above, previous approaches have provided no solution that can manage queuing latency of the differences between paths (such as different number of hops, or differences in already encountered queuing latency).

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD- ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A node for transferring packets over a network, comprising:
   a network interface configured to receive and forward packets over the network;
   one or more queues configured to store packets to forward over the network; and
   one or more processors coupled to the one or more queues and the network interface, such that the node is configured to:
      receive, from the network interface, a packet, the packet including a network header, indicating a network destination, and a forwarding header, the forwarding header indicating an accumulated delay experienced by the packet since being transmitted by a network sender, a requested lower bound for a time for the transfer of the packet from the network sender to the network destination, a requested upper bound for the time for the transfer of the packet from the network sender to the network destination, and a latency policy;
      update the accumulated delay experienced by the packet that is indicated by the forwarding header;
      determine a minimum delay at the node for the packet based on the requested lower bound and the updated indicated accumulated delay experienced by the packet;
      determine a maximum delay at the node for the packet based on the requested upper bound and the updated indicated accumulated delay experienced by the packet;
      determine a queueing rank for the packet from the minimum delay, the maximum delay, and the latency policy; and
      enter the packet into one of the queues based on the determined queueing rank for the packet; and
      forward the packet from the queue into which it is entered.

2. The node of claim 1, wherein the one or more queues are a plurality of queues, and the node is further configured to:
   rank the plurality of queues based upon priorities of packets enqueued therein;
   determine the priority for the packet from the maximum delay for the packet and the minimum delay for the packet; and
   enter the packet into one of the queues by:
      determining, based the packet's priority, into which of the queues to enter the packet; and
      entering the packet into the determined one of the queues based on the determined queueing rank for the packet.

3. The node of claim 1, wherein the node is further configured to:
   receive a number of hops from the node to the network destination; and
   further determine the minimum delay based on the number of hops.

4. The node of claim 3, wherein the latency policy indicates equally sharing an amount of the requested lower bound exceeding a difference between the updated indicated accumulated delay experienced by the packet between the node and the number of hops.

5. The node of claim 1, wherein the node is further configured to:
   receive an estimated amount of time for fixed transfer times between the node and the network destination; and
   further determine the minimum delay based on the estimated amount of time for fixed transfer times between the node and the network destination.

6. The node of claim 1, wherein the forwarding header further indicates a maximum latency for the transfer of the packet from the network sender to the network destination, and the node is further configured to:
   discard the packet if the updated accumulated delay experienced by the packet exceeds the maximum latency.

7. The node of claim 1, wherein the node is a router.

8. A method of transferring a packet over a network, comprising:
   receiving, at a node, a packet including a network header, indicating a network destination, and a forwarding header, the forwarding header indicating an accumulated delay experienced by the packet since being transmitted by a network sender, a requested lower bound for a time for the transfer of the packet from the network sender to the network destination, a requested upper bound for the time for the transfer of the packet from the network sender to the network destination, and a latency policy;
   updating, by the node, the accumulated delay experienced by the packet that is indicated by the forwarding header;
   determining, by the node, a minimum delay at the node for the packet based on the requested lower bound and the updated indicated accumulated delay experienced by the packet;
   determining, by the node, a maximum delay at the node for the packet based on the requested upper bound and the updated indicated accumulated delay experienced by the packet;
   maintaining by the node of one or more queues of packets for transmission from the node;
   determining, by the node, a queueing rank for the packet from the minimum delay, the maximum delay, and the latency policy; and
   entering the packet into one of the queues based on the determined queueing rank for the packet; and
   forwarding the packet from the queue into which it is entered.

9. The method of claim 8, further comprising:
   receiving, at the node, a number of hops from the node to the network destination, and
   wherein determining the minimum delay at the node for the packet is further based on the number of hops.

10. The method of claim 9, wherein the latency policy indicates equally sharing an amount of the requested lower bound exceeding a difference between exceeding the updated indicated accumulated delay experienced by the packet between the node and the number of hops.

11. The method of claim 8, further comprising:
   receiving, at the node, an estimated amount of time for fixed transfer times between the node and the network destination; and
   wherein determining the minimum delay at the node for the packet is further based on the estimated amount of time for fixed transfer times between the node and the network destination.

12. The method of claim 8, wherein the forwarding header further indicates a maximum latency for the transfer of the packet from the network sender to the network destination, the method further comprising:

discarding the packet if the updated accumulated delay experienced by the packet exceeds the maximum latency.

13. The method of claim 8, wherein the node maintains a plurality of queues of packets for transmission from the node, the method further comprising:

determining, by the node, a priority for the packet from the maximum delay for the packet and the minimum delay for the packet; and ranking the plurality of queue based upon priorities of packets enqueued therein, wherein entering the packet into one of the queues includes:

determining, based the packet's priority, into which of the queues to enter the packet; and entering the packet into the determined one of the queues based on the determined queueing rank for the packet.

14. A system for transmitting packets from a sending network device to a receiving network device, comprising:

one or more nodes connectable in series to transfer a packet from the sending network device to the receiving network device, each of the nodes comprising:

a network interface configured to receive and forward the packet over the network, the packet including a network header, indicating the receiving network device, and a forwarding header, indicating an accumulated delay experienced by the packet since being transmitted by the sending network device, a requested lower bound for a time for the transfer of the packet from the sending network device to the receiving network device, a requested upper bound for the time for the transfer of the packet from the network sender to the network destination, and a latency policy;

one or more queues configured to store packets to forward over the network; and one or more processors coupled to the one or more queues and the network interface, such that the node configured to:

receive the packet from the network interface;

update the accumulated delay experienced by the packet that is indicated by the forwarding header;

determine a minimum delay at the node for the packet based on the requested lower bound and the updated indicated accumulated delay experienced by the packet;

determine a maximum delay at the node for the packet based on the requested upper bound and the updated indicated accumulated delay experienced by the packet;

determine a queueing rank for the packet from the minimum delay, the maximum delay, and the latency policy; and enter the packet into one of the queues based on the determined queueing rank for the packet; and forward the packet from the queue into which it is entered.

15. The system of claim 14, wherein, for each of the one or more nodes, the node is further configured to:

receive a number of hops between the node to the receiving network device; and to further determine the minimum delay based on the number of hops.

16. The system of claim 14, wherein, for each of the one or more nodes, the node is further configured to:

receive an estimated amount of time for fixed transfer times between the node to the receiving network device; and to further determine the minimum delay based on the estimated amount of time for fixed transfer times between the node and the receiving network device.

17. The system of claim 14, wherein the one or more queues are a plurality of queues, and, for each of the one or more nodes, the node is further configured to:

rank the plurality of queues based upon priorities of packets enqueued therein;

determine a priority for the packet from the maximum delay for the packet and the minimum delay for the packet; and enter the packet into one of the queues by:

determining, based the packet's priority, into which of the queues to enter the packet; and entering the packet into the determined one of the queues based on the determined queueing rank for the packet.

\* \* \* \* \*

UNITED STATES PATENT AND TRADEMARK OFFICE
CERTIFICATE OF CORRECTION

PATENT NO. : 11,362,959 B2  
APPLICATION NO. : 16/822458  
DATED : June 14, 2022  
INVENTOR(S) : Eckert et al.

Page 1 of 1

It is certified that error appears in the above-identified patent and that said Letters Patent is hereby corrected as shown below:

On the Title Page

Abstract, Line 14: After "to" and before "used" insert -- be --.

In the Claims

Column 27, Lines 40-41 (Claim 14, Lines 21-22): After "node" and before "configured" insert -- is --.

Signed and Sealed this  
Sixteenth Day of August, 2022

Katherine Kelly Vidal  
*Director of the United States Patent and Trademark Office*